(12) United States Patent
Zhu et al.

(10) Patent No.: US 11,325,781 B2
(45) Date of Patent: May 10, 2022

(54) TRACK APPARATUS, DELIVERY SHUTTLE CAR AND MATERIAL HANDLING SYSTEM

(71) Applicant: Hangzhou Huicang Information Technology Company Limited, Hangzhou (CN)

(72) Inventors: Junda Zhu, Hangzhou (CN); Zhengyong Zhang, Hangzhou (CN); Zheng Zou, Hangzhou (CN); Biao Chen, Hangzhou (CN)

(73) Assignee: Hangzhou Huicang Information Technology Company Limited, Hangzhou (CN)

(*) Notice: Subject to any disclaimer, the term of this patent is extended or adjusted under 35 U.S.C. 154(b) by 121 days.

(21) Appl. No.: 16/813,731

(22) Filed: Mar. 9, 2020

(65) Prior Publication Data

US 2021/0039887 A1 Feb. 11, 2021

(30) Foreign Application Priority Data

Aug. 7, 2019 (CN) .......................... 201910725174.7

(51) Int. Cl.
*B65G 1/137* (2006.01)
*B65G 47/24* (2006.01)

(52) U.S. Cl.
CPC .......... *B65G 1/1375* (2013.01); *B65G 47/24* (2013.01)

(58) Field of Classification Search
CPC ...... B61B 13/02; B65G 1/0492; B65G 1/065; B65G 1/1373; B65G 1/04; B65G 1/0421; B65G 1/137; B65G 1/1375; B65G 47/24; E01B 7/00

USPC ........ 198/347.1, 468.6, 370.1, 371.2, 468.01
See application file for complete search history.

(56) References Cited

U.S. PATENT DOCUMENTS

| | | | |
|---|---|---|---|
| 5,398,617 A * | 3/1995 | Deandrea ................ | B61B 13/02 105/29.1 |
| 6,671,580 B2 * | 12/2003 | Campbell .......... | G11B 15/6835 318/567 |
| 6,805,526 B2 * | 10/2004 | Stefani ..................... | B65G 1/04 414/278 |
| 9,122,566 B2 * | 9/2015 | Bastian, II ........... | B65G 1/0492 |
| 2014/0212249 A1 * | 7/2014 | Kawano ............... | B65G 1/0435 414/277 |
| 2016/0060036 A1 * | 3/2016 | Nakade .................. | G06Q 10/08 701/19 |
| 2016/0122135 A1 * | 5/2016 | Bastian, II ........... | B65G 1/0492 198/347.1 |
| 2017/0008701 A1 * | 1/2017 | Terrill .................. | B65G 1/0492 |

* cited by examiner

*Primary Examiner* — Gregory W Adams
(74) *Attorney, Agent, or Firm* — Dragon Sun Law Firm, PC; Jinggao Li, Esq.

(57) ABSTRACT

This invention provides a rack apparatus, a delivery carriage and the automated storage and distribution system thereof. In the rack apparatus, there are only two racks at both sides of the rack apparatus extending in a generally vertical direction. And in the carriage, there are only two driving wheels. Therefore, both the rack apparatus and the carriage simplify the structure of the rack apparatus and the carriage and reduce the installation accuracy and the failure points thereof, but still provide new improvements to keep the carriage body horizontal with the ground.

15 Claims, 21 Drawing Sheets

TRACK APPARATUS, DELIVERY SHUTTLE CAR AND MATERIAL HANDLING SYSTEM

CROSS-REFERENCE TO RELATED PATENT APPLICATION

This application claims priority to and the benefit of the Chinese Patent Application Serial No. 201910725174.7, filed Aug. 7, 2019 in the China National Intellectual Property Administration (CNIPA), which is expressly incorporated by reference herein in its entirety.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference is individually incorporated by reference.

TECHNICAL FIELD

The present disclosure relates to the field of warehouse and logistics automation, and more particularly relates to a rack apparatus, a two-wheel drive carriage, and an automated storage and distribution system.

BACKGROUND

For an automated storage and distribution systems, a rack apparatus usually has an intersection between the horizontal rail and the vertical rail. For an existing rack apparatus, when a computer-controlled carriage drives through the intersection to a horizontal or a vertical path, the traditional traffic mechanism at the intersection can obstruct other carriage to pass through the intersection for a period of time. As a result, the rack apparatus is fully utilized.

Further, the existing carriage uses the motor to drive the wheels to rotate, and often uses a four-wheel drive. The number of motors and driving axles for driving the wheels is fairly large, which can result in a complex structure and a large number of components of the carriage.

Furthermore, for the existing carriage, the driving mode of multi-wheels and multi-axles can lead to the following drawbacks: (a) the control mode of the carriage is complex, which often depends on an independent central traffic controller; (b) there are strict requirements for the design and installation accuracy of the rack apparatus; and/or (c) there are many failure points in the existing automated storage and distribution systems.

Therefore, a heretofore unaddressed need exists in the art to address the aforementioned deficiencies and inadequacies.

SUMMARY

In view of the shortcomings of the existing technology and the actual requirements, the present disclosure provides a rack apparatus, a two-wheel drive carriage and, an automated storage and distribution system.

First, the present disclosure provides a rack apparatus for guiding a carriage to deliver an article to or from a destination area, including:

a first rack at a first side of the rack apparatus extending in a first direction;

a second rack opposed to the first rack, disposed at a second side of the rack apparatus and parallel or substantially parallel to the first rack;

a third rack disposed between the first rack and the second rack, extending in a second direction and perpendicular or substantially perpendicular to the first direction; and an intersection between the third rack and each of the first and the second racks, wherein each of the first, second and third racks comprises two rails in parallel and wherein the intersection includes a plurality of slabs that are capable of guiding the carriage to move in either the first direction or the second direction.

Further, the rack apparatus provides multiple slabs as auxiliary guiding rails for guiding a carriage to move in either the first direction or the second direction, and it reduces the need for driving wheels and the power mechanism thereof.

In one embodiment, the plurality of slabs includes a first slab and a second slab, wherein each of the first and second slabs are capable of moving in the third direction between a first position and a second position.

In one embodiment, the plurality of slabs further includes a third slab; and wherein the third slab can move in the second direction between a third position and a fourth position.

In one embodiment, when the first and second slabs are in the first position and the third slab is in the third position, the carriage is capable of moving along one of the first and second racks; and when the first and second slabs are in the second position, and the third slab is in the fourth position, the carriage is capable of moving along the third rack.

In one embodiment, the first slab has a first side wall and the first side wall has a first plurality of gear teeth or notches; and the first plurality of gear teeth or notches can guide the movement of the carriage in the first direction.

In one embodiment, the first slab has a first side wall and a second arc-shaped side wall, wherein, the first side wall has a first plurality of gear teeth or notches; and the first plurality of gear teeth or notches can guide the movement of the carriage in the first direction; and the second arc-shaped side wall has a second plurality of gear teeth or notches, so that the second plurality of gear teeth or notches can guide the carriage to move in the first direction to the second direction, or vice versa.

In one embodiment, the second slab has a first arc-shaped side wall so that the carriage can be guided to move in the first direction to in the second direction, or vice versa.

In one embodiment, the third slab has a second arc-shaped side wall and the second arc-shaped side wall has a second plurality of gear teeth or notches, so that the second plurality of gear teeth or notches can guide the carriage to move in the first direction to in the second direction, or vice versa.

In one embodiment, the rack apparatus further includes:

a fourth rack disposed between the first rack and the second rack, extending in the second direction, parallel or substantially parallel to the third rack, and separated from the third rack in a third direction; and an intersection between the fourth rack and each of the first and the second racks;

wherein the intersection includes a plurality of slabs that are capable of guiding the carriage to move in either the first direction or the second direction.

In one embodiment, the third rack and the fourth rack form a closed-loop path for the carriage through the intersection.

In one embodiment, the rack apparatus further includes:

a fifth rack disposed between the first rack and the second rack, extending in the second direction and perpendicular or substantially perpendicular to the first direction; and a sixth rack disposed between the first rack and the second rack, extending in the second direction, parallel or substantially parallel to the fifth rack, and separated from the fifth rack in a third direction.

In one embodiment, the fifth rack and the sixth rack are separated from the third and fourth racks in the first direction.

In one embodiment, each of the first and the second racks has a third side wall and the third side wall has a third plurality of gear teeth or notches; and the third plurality of gear teeth or notches can guide the movement of the carriage in the first direction; and each of the third and fourth racks has a fourth side wall and the fourth side wall has a fourth plurality of gear teeth or notches; and the fourth plurality of gear teeth or notches can guide the movement of the carriage in the second direction.

In one embodiment, the intersection further includes a first member, wherein the first member is disposed between an upper member and a lower member of one of the first and second racks, and the first member can guide the movement of the carriage in the first direction.

In one embodiment, the first member has a fifth side wall and the fifth side wall includes a fifth plurality of gear teeth or notches; and the fifth plurality of gear teeth or notches can guide the movement of the carriage in the first direction.

In one embodiment, the intersection further includes a second member, wherein the second member can guide the movement of the carriage in the second direction.

In one embodiment, the intersection further includes a third member attached to the second member; the third member has a sixth side wall; the sixth side wall includes a sixth plurality of gear teeth or notches; and the sixth plurality of gear teeth or notches can guide the movement of the carriage in the second direction.

In one embodiment, the intersection further includes a fourth member attached to the second member, and the fourth member has a second arc-shaped side wall so that the carriage can be guided to move in the first direction to the second direction, or vice versa.

In one embodiment, the second, third and the fourth members are extended from the third rack, the first and second members can be orientated to be in the same plane in the third direction;

the second, third and the fourth members can be integrated as one part of the intersection; and the first and second member can be an integrated as one part of the intersection of the intersection.

Alternatively, the present disclosure provides two-wheel drive carriage driving along a rack apparatus, including:

a carriage body having a first end and a second end opposed to the first end;

an item handling mechanism connected to the carriage body for delivering an article to or from a destination area;

a first driving wheel approximately located on a first longitudinal central axis of the first end;

a second driving wheel opposed to the first driving wheel, approximately located on a second longitudinal central axis of the second end;

a first plurality of idler wheels located on both sides of the first end; and a second plurality of idler wheels located on both sides of the second end, wherein the first and second plurality of idler wheels are guided by a plurality of leveling rails of the rack apparatus, thereby being capable of maintaining the orientation of the carriage relative horizontally as the carriage drives along the rack apparatus.

In one embodiment, the first plurality of idler wheels includes a first and a second idler wheels disposed on one side of the first end and a third and a fourth idler wheels disposed on the other side of the first end.

In one embodiment, the first to fourth wheels are located at four corners of the first end.

In one embodiment, the second plurality of idler wheels includes a fifth idler and a sixth idler wheels on one side of the second end and a seventh and an eighth idler wheels on the other side of the second end.

In one embodiment, the fifth to eighth wheels are located at four corners of the second end.

In one embodiment, the first and second driving wheels each are driven by a first motor via a single axle passing through the carriage body, together with a chain, a synchronous belt, or separate actuators.

In one embodiment, the first and second driving wheels each are driven by a first motor via a single axle passing through the carriage body, together with a chain, a synchronous belt, or separate actuators.

In one embodiment, the item handling mechanism can be connected to a first plurality of operation modules to realize functions including storage, picking, and distribution.

In one embodiment, the item handling mechanism further includes a frame and a second plurality of operation modules connected to the frame, and wherein the second plurality of operation modules includes a plurality of transfer mechanisms, a clamping and/or telescopic mechanism.

In one embodiment, the transfer mechanisms of the item handling mechanism include a conveyor belt, and the conveyor belt is driven by a second motor to deliver items.

In one embodiment, the clamping and/or telescopic mechanism includes a telescopic arm, a synchronous belt, a linear module and a plucking rod.

In one embodiment, the carriage further includes a plurality of proximity sensors for sensing the state of the carriage and/or the items on the carriage, wherein the state of the carriage includes a driving state and/or a position of the carriage, and the driving state includes standing by, normal moving, reaching the target position, leaving the target position, and being in failure.

In one embodiment, the carriage further includes a plurality of brushes for conducting electric current.

In one embodiment, the item handling mechanism further includes a visual recognition module and at least a machine-hand/manipulator cooperating with the recognition module, wherein the visual recognition module includes a camera and a processor.

In one embodiment, the carriage further includes a main control module set on the carriage body, wherein the main control module includes a processing unit and a communication unit;

the processing unit is used for calculating a safe travel distance of the carriage based on predetermined traffic rules, for executing the rules, and for determining the real-time location of the carriage, wherein the safe travel distance is to prevent the collision between their rights of way of the carriage and the neighboring carriages; and the main control module is to share the real-time location of the carriage with neighboring carriages on the rack apparatus by the communication unit.

In one embodiment, the first and second idler wheels have a first same plane and the third and fourth idler wheels have a second same plane along the first longitudinal central axis, and wherein the first same plane and the second same plane has a first distance to be a first predetermined value so that the first and second plurality of idler wheels are guided by the plurality of leveling rails of the rack apparatus.

In one embodiment, the fifth and sixth idler wheels have a third same plane and the seventh and eighth idler wheels have a fourth same plane along the second longitudinal central axis, and wherein the third same plane and the fourth same plane has a second distance to be a second predetermined value so that the first and second plurality of idler wheels are guided by the plurality of leveling rails of the rack apparatus.

Alternatively, the present disclosure provides an automated storage and distribution system, including:

multiple storage and distribution locations on both sides of the rack apparatus for sorting or retrieving multiple items;

the rack apparatus as mentioned above; and the carriage as mentioned above.

It is understood that the automated storage and distribution system is significantly improved by the use of the rack apparatus and the carriage.

BRIEF DESCRIPTION OF THE DRAWINGS

The accompanying drawings illustrate one or more embodiments of the present disclosure and, together with the written description, serve to explain the principles of the present disclosure. Wherever possible, the same reference numbers are used throughout the drawings to refer to the same or like elements of an embodiment.

DETAILED DESCRIPTION

Figure 1:
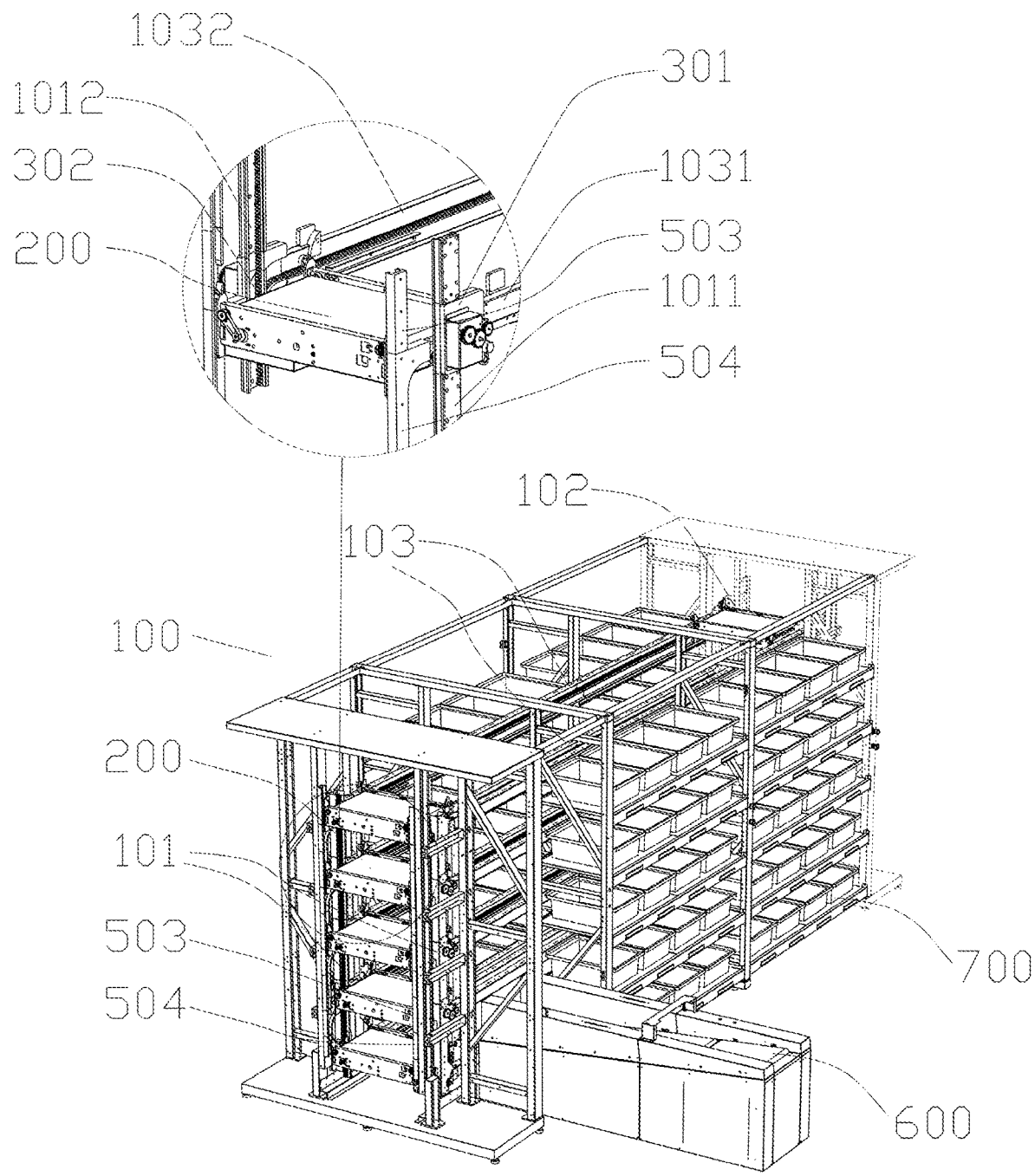
FIG. 1 is a schematic diagram of the rack apparatus in one embodiment of the disclosure.

The present disclosure will now be described more fully hereinafter with reference to the accompanying drawings, in which exemplary embodiments of the present disclosure are shown. The present disclosure may, however, be embodied in many different forms and should not be construed as limited to the embodiments set forth herein. Rather, these embodiments are provided so that this disclosure is thorough and complete, and will fully convey the scope of the present disclosure to those skilled in the art. Like reference numerals refer to like elements throughout.

The terms used in this specification generally have their ordinary meanings in the art, within the context of the present disclosure, and in the specific context where each term is used. Certain terms that are used to describe the present disclosure are discussed below, or elsewhere in the specification, to provide additional guidance to the practitioner regarding the description of the present disclosure. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It is appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the present disclosure or of any exemplified term. Likewise, the present disclosure is not limited to various embodiments given in this specification.

It is understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It is understood that, although the terms Firstly, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the present disclosure.

It is understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It is also appreciated by those of skill in the art that references to a structure or feature that is disposed "adjacent" to another feature may have portions that overlap or underlie the adjacent feature.

The terminology used herein is for the purpose of describing particular embodiments only and is not intended to be limiting of the present disclosure. As used herein, the singular forms "a," "an," and "the" are intended to include the multiple forms as well, unless the context clearly indicates otherwise. It is further understood that the terms "comprises" and/or "comprising," or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It is understood that relative terms are intended to encompass different orientations of the device in addition to the orientation shown in the figures. For example, if the device in one of the figures is turned over, elements described as being on the "lower" side of other elements will then be oriented on the "upper" sides of the other elements. The exemplary term "lower" can, therefore, encompass both an orientation of lower and upper, depending on the particular orientation of the figure. Similarly, for the terms "horizontal", "oblique" or "vertical", in the absence of other clearly defined references, these terms are all relative to the ground. Similarly, if the device in one of the figures is turned over, elements described as "below" or "beneath" other elements will then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present disclosure belongs. It is further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around," "about," "substantially," "generally" or "approximately" shall generally mean within 20 percent, preferably within 10 percent, and more preferably within 5 percent of a given value or range. Numerical quantities given herein are approximate, meaning that the terms "around," "about," "substantially," "generally" or "approximately" can be inferred if not expressly stated.

As used herein, the terms "comprise" or "comprising," "include" or "including," "carry" or "carrying," "has/have" or "having," "contain" or "containing," "involve" or "involving" and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

Embodiments of the present disclosure are illustrated in detail hereinafter with reference to accompanying drawings. It should be understood that specific embodiments described herein are merely intended to explain the present disclosure, but not intended to limit the present disclosure.

In order to further elaborate the technical means adopted by the present disclosure and its effect, the technical scheme of the present disclosure is further illustrated in connection with the drawings and through specific mode of execution, but the present disclosure is not limited to the scope of the implementation examples.

The present disclosure relates to the field of warehouse and logistics automation, and more particularly relates to a rack apparatus, a two-wheel drive carriage and an automated storage and distribution system.

Figure 2A:
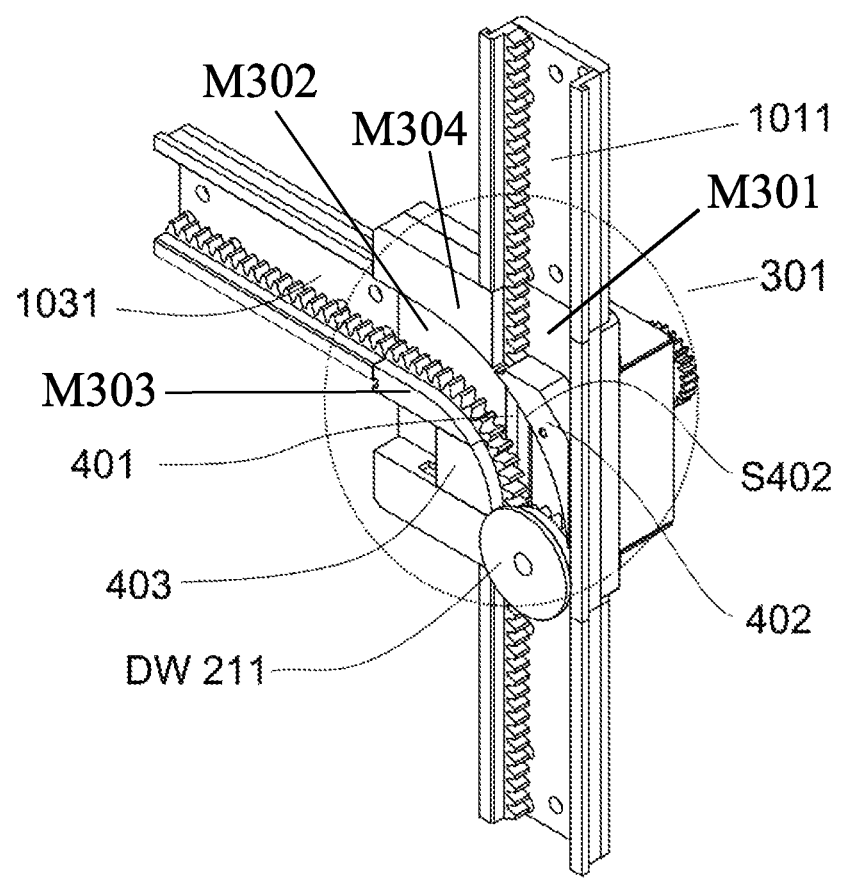
FIG. 2A-FIG. 2D are the schematic diagrams of an intersection with three movable slabs in another embodiment of the disclosure.

In one embodiment, referring to FIG. 1 and FIG. 2A, the present disclosure provides a rack apparatus 100 for guiding a carriage 200 to deliver an article to or from a destination area 700, including:

a first rack 101 at a first side of the rack apparatus 100 extending in a first direction;

a second rack 102 opposed to first rack 101, disposed at a second side of the rack apparatus 100 and parallel or substantially parallel to first rack 101;

a third rack 103 disposed between first rack 101 and the second rack 102, extending in a second direction and perpendicular or substantially perpendicular to the first direction; and an intersection 301 or 302 between third rack 103 and each of first and second racks 101 and 102, wherein each of the first, second and third racks comprises two rails in parallel and wherein the intersection comprises a plurality of slabs that are capable of guiding the carriage to move in either the first direction or the second direction.

Referring to FIG. 1, first rack 101 includes a first vertical rail 1011 and a second vertical rail 1012. Second rack 102 also includes two vertical rails. Third rack 103 includes a first horizontal rail 1031 and a second horizontal rail 1032, wherein intersection 301 is between first horizontal rail 1031 and first vertical rail 1011, and intersection 302 is between second horizontal 1032 and second vertical rail 1012.

For the above-mentioned embodiment of the present disclosure, (i) because the first and second racks, as two sets of vertical rails, are disposed at both sides of the rack apparatus, the rack apparatus saves the manufacturing costs and simplifies the structure of the rack apparatus. Further, the rack apparatus reduces the failure points caused by too many rail intersections and the installation accuracy of the rack apparatus;

(ii) as illustrated in FIG. 1, the present disclosure provides the first rack and second rack at both sides of the rack apparatus extending in a generally vertical direction, so carriage 200 can deliver articles/items to or from the destination area 700 during horizontal movements without excessive vertical movements; and (iii) as illustrated in FIG. 2A, intersection 301 includes slab 401 as a first slab 401, slab 402 as a second slab, and slab 403 as a third slab, that are capable of guiding carriage 200, driven by a wheel DW211, to move in either the first direction along first vertical rail 1011 or the second direction along first horizontal rail 1031.

In another embodiment, referring to FIG. 3, intersection 301 includes a slab 4011 as the first slab and a slab 402 as the second slab, that are capable of moving in the third direction between a first position and a second position. And intersection 301 guides carriage 200, driven by a wheel DW211, to move in either the first direction along first vertical rail 1011 or the second direction along first horizontal rail 1031.

Figure 2B:
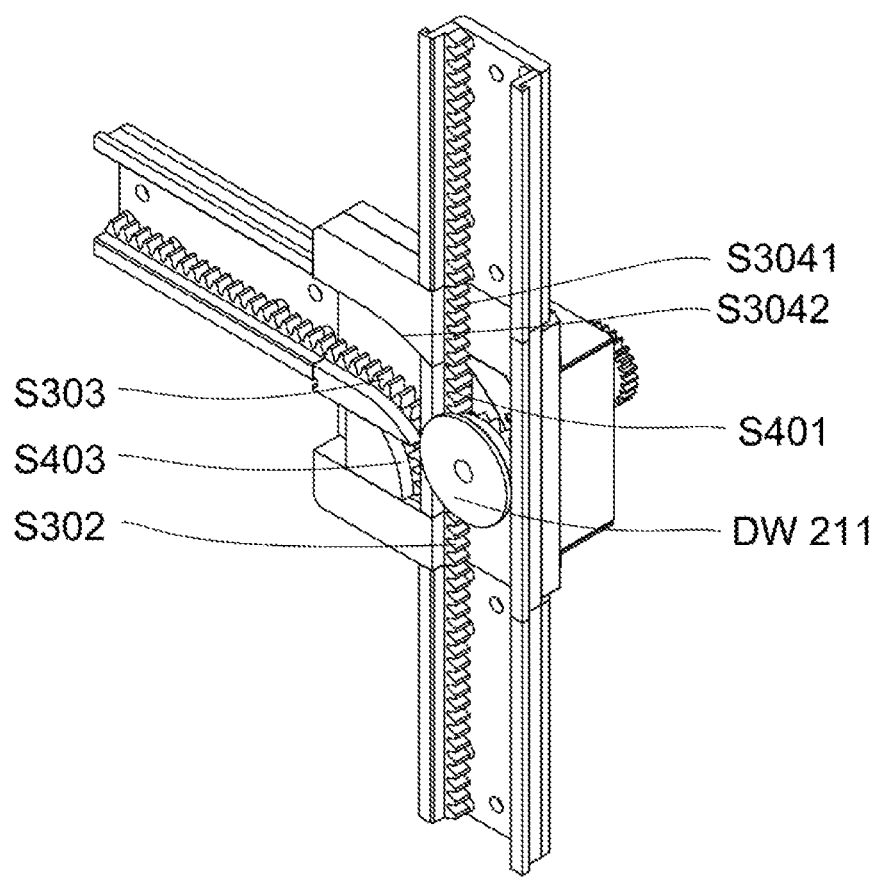

Referring to FIG. 2A and FIG. 2B, in another embodiment, the plurality of slabs further includes a third slab 403; and third slab 403 can move in the second direction between a third position and a fourth position;

when first and second slabs 401, 402 are in the first position, and third slab 403 is in the third position, carriage 200 driven by the wheel DW211 is capable of moving along one of the first and second racks; and when first and second slabs 401, 402 are in the second position, and third slab 403 is in the fourth position, carriage 200 driven by the wheel DW211 is capable of moving along the third rack.

In FIG. 2A, when first slab 401 pulls in along the third direction, second slab 402 pushes out along the third direction, and third slab 403 pushes out along the second direction, carriage 200 is capable of moving along horizontal rail 1031 of third rack 103; and in FIG. 2B, when first slab 401 pushes out along the third direction, second slab 402 pulls in along the third direction, and third slab 403 pulls in along the second direction, carriage 200 is capable of moving along one of the first and second racks, such as vertical rail 1011 of first rack 101.

In another embodiment, multiple individual retractable slabs 401, 402, and 403 at intersection 301, which can move in any of at least three possible working-modes (referring to FIG. 2A, FIG. 2B, and FIG. 2C), wherein the three possible working-modes include:

(i) state 1:

in this state, the slabs move independently or jointly to form a first path through the intersection along one of the vertical rails;

(ii) state 2:

in this state, at the intersection, the slabs move independently or jointly to form a second path at an angle to the first path to allow one of the carriages to change the direction of movement, wherein the said angle is the angle value between the horizontal rail and the vertical rail; and (iii) state 3:

the default state of the rails, and in this state, the slabs return to the default position right after one of the carriages passed through the intersection, to allow another possible delivery carriage to pass through the intersection and follow the first or second path.

In another embodiment, referring to FIG. 2B, slab 401, as the first slab, has a side wall S401 as a first side wall and the first side wall has a first plurality of gear teeth or notches; and the first plurality of gear teeth or notches can guide the movement of carriage 200 driven by wheel DW211 in the first direction.

Figure 3A:
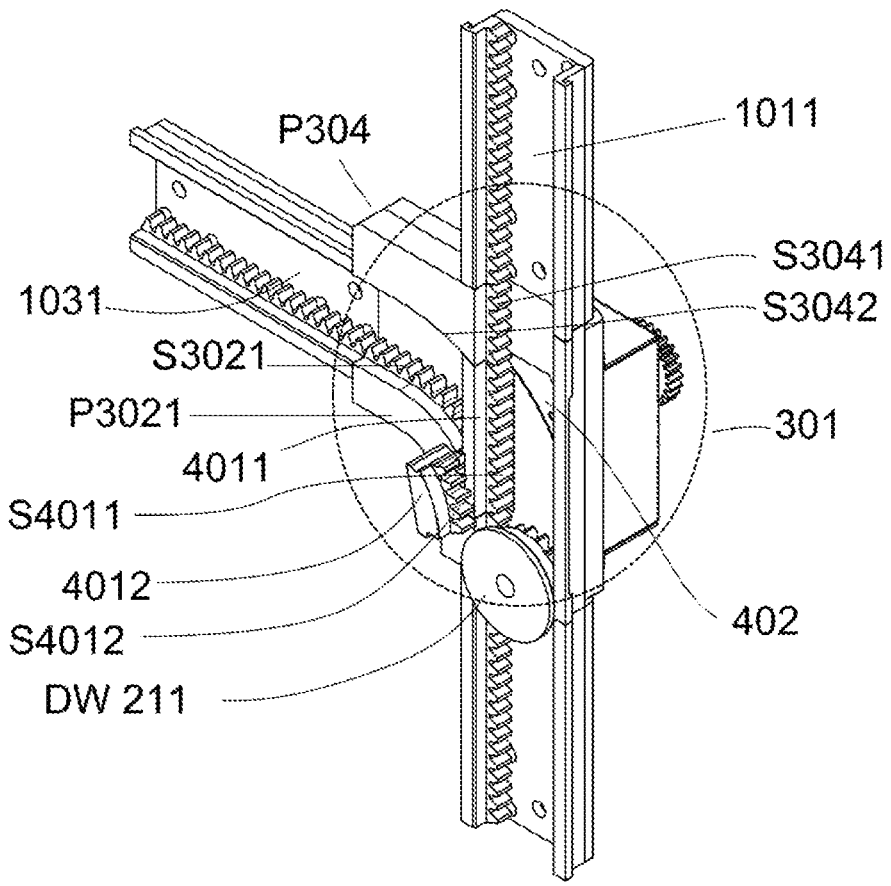
FIG. 3A, FIG. 3D, and FIG. 3E are the schematic diagrams of the intersection with two movable slabs in another embodiment of the disclosure.

In another embodiment, referring to FIG. 3A, slab 4011, as the first slab, has a side wall S4011 as the first side wall and a second arc-shaped side wall S4012, wherein side wall S4011 has a first plurality of gear teeth or notches; and the first plurality of gear teeth or notches can guide the movement of the carriage in the first direction; and the second arc-shaped side wall S4012 has a second plurality of gear teeth or notches, so that the second plurality of gear teeth or notches can guide the carriage to move in the first direction to the second direction, or vice versa.

Figure 3B:
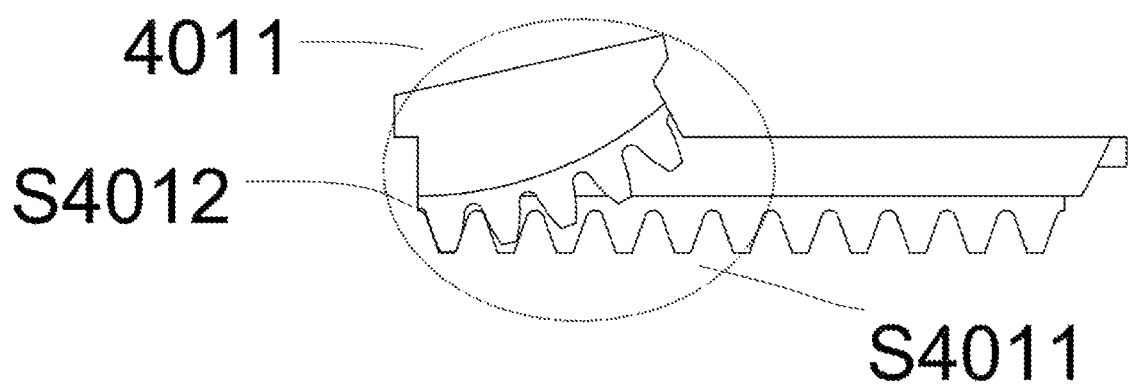
FIG. 3B-FIG. 3C are the schematic diagrams of one movable slab with a gear tooth surface and a rack tooth surface in another embodiment of the disclosure.
Figure 3C:
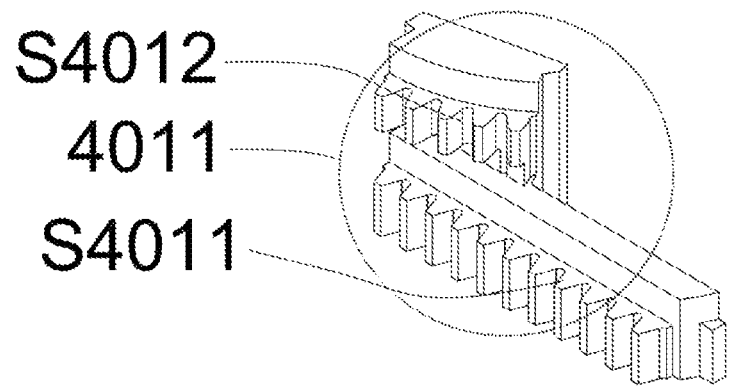
Figure 3D:
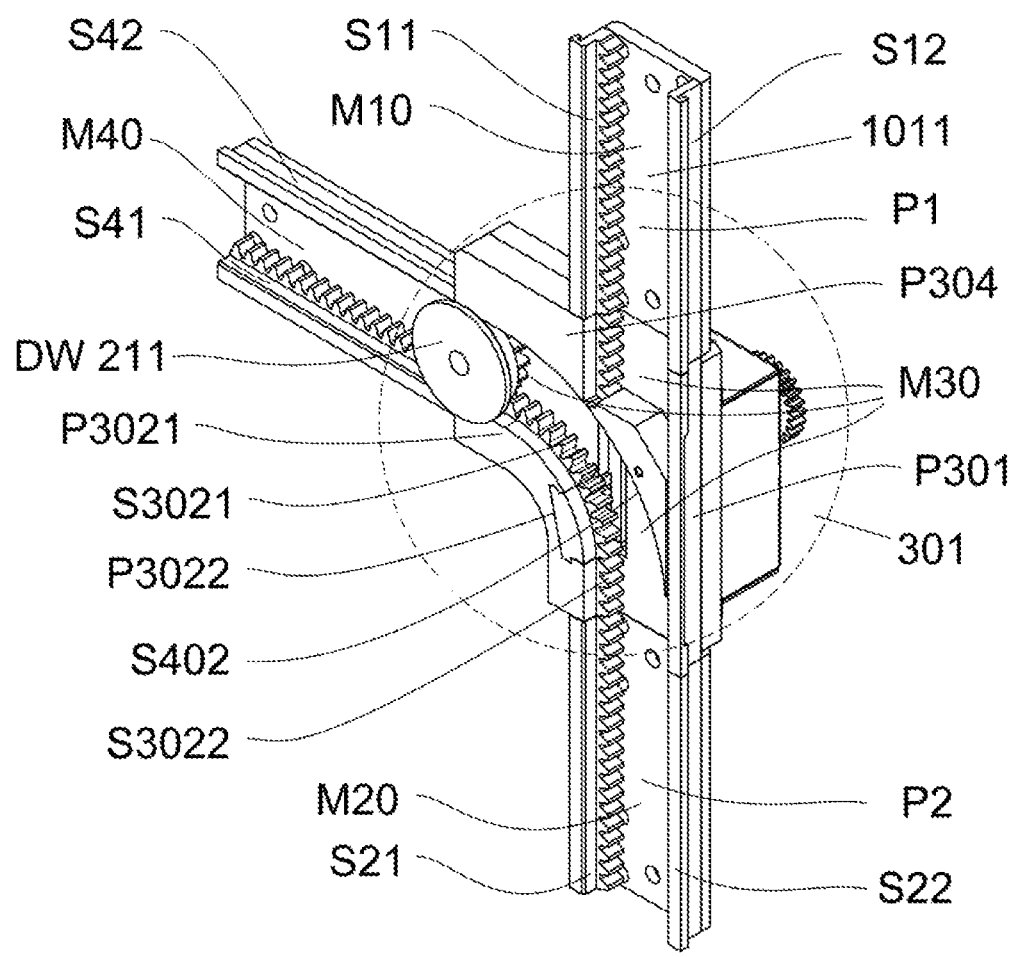

Referring to FIG. 2A or FIG. 3D, in one embodiment, second slab 402 has a first arc-shaped side wall S402 so that the carriage can be guided to move in the first direction to in the second direction, or vice versa.

Referring to FIG. 2A and FIG. 2B, in one embodiment, third slab 403 has a second arc-shaped side wall S403 and the second arc-shaped side wall has a second plurality of gear teeth or notches, so that the second plurality of gear teeth or notches can guide the carriage to move in the first direction to in the second direction, or vice versa.

In another embodiment, the rack apparatus further includes:

a fourth rack disposed between the first rack and the second rack, extending in the second direction, parallel or substantially parallel to the third rack, and separated from the third rack in a third direction; and an intersection between the fourth rack and each of the first and the second racks; wherein the intersection comprises a plurality of slabs that are capable of guiding the carriage to move in either the first direction or the second direction.

It is understood that, there can be at least two horizontal racks in the same plane. In this way, the utilization ratio of the horizontal rack at the same height and the destination area can be improved. For example, the present disclosure can use the technology of a train track change to realize the embodiment.

In another embodiment, the third rack and the fourth rack form a closed-loop path for the carriage through the intersection.

In another embodiment, the utilization ratio of the horizontal rack at the same height and the destination area can be further improved. It is understood that, the first or second rack is more frequently utilized upload or download articles, and the third and the fourth racks are more frequently utilized to distribute or store articles, even to solve the problem of storage errors of the third and fourth racks at the same height without using the first or second rack. For example, the present disclosure can use the technology of a train track change and the train track loop to realize the embodiment.

In another embodiment, the rack apparatus further includes:

a fifth rack disposed between the first rack and the second rack, extending in the second direction and perpendicular or substantially perpendicular to the first direction; and a sixth rack disposed between the first rack and the second rack, extending in the second direction, parallel or substantially parallel to the fifth rack, and separated from the fifth rack in a third direction.

In another embodiment, the fifth rack and the sixth rack are separated from the third and fourth racks in the first direction.

It is understood that, the fifth rack and the sixth rack are similar to the third and the fourth rack, but the height of the fifth rack or the sixth rack is different from that of the third or the fourth rack.

Figure 2C:
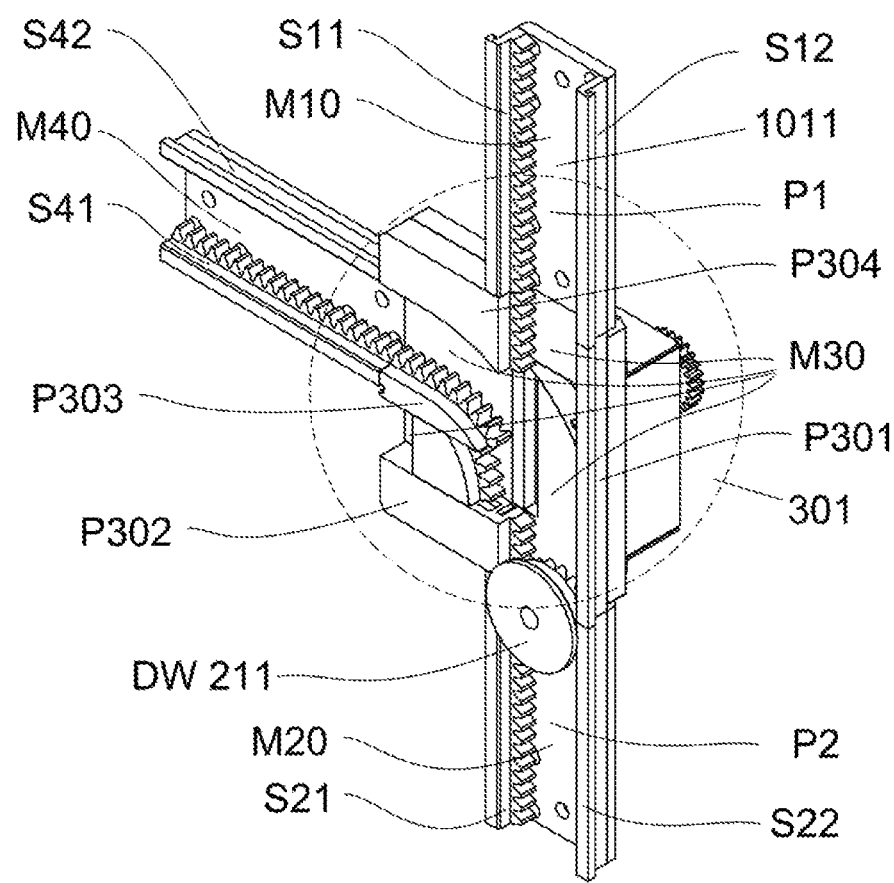

In another embodiment, referring to FIG. 2C and FIG. 2A, each of the first and the second racks, such as vertical rail 1011, has a third side wall S11 or S21 and the third side wall has a third plurality of gear teeth or notches; and the third plurality of gear teeth or notches can guide the movement of carriage 200 driven by a wheel DW211 in the first direction; and each of the third and fourth racks, such as horizontal rail 1031 has a fourth side wall S41 and the fourth side wall has a fourth plurality of gear teeth or notches; and the fourth plurality of gear teeth or notches can guide the movement of the carriage in the second direction.

In another embodiment, referring to FIG. 2A, intersection 301 further includes a first member M301, wherein first member M301 is disposed between an upper member P1 and a lower member P2 of vertical rail 1011 of first rack 101, and first member M301 can guide the movement of the carriage in the first direction.

In another embodiment, referring to FIG. 2A, first member M301 has a fifth side wall S3041 and the fifth side wall comprises a fifth plurality of gear teeth or notches; and the fifth plurality of gear teeth or notches can guide the movement of the carriage in the first direction.

In another embodiment, referring to FIG. 2A, intersection 301 further includes a second member M302, wherein the second member can guide the movement of the carriage in the second direction.

In another embodiment, referring to FIG. 2A and FIG. 2B, intersection 301 further includes a third member M303 attached to second member M302; the third member has a sixth side wall S303; the sixth side wall includes a sixth plurality of gear teeth or notches; and the sixth plurality of gear teeth or notches can guide the movement of the carriage in the second direction.

In another embodiment, referring to FIG. 2A, intersection 301 further includes a fourth member M304 attached to the second member M302, and the fourth member has a second arc-shaped side wall S3042 so that the carriage can be guided to move in the first direction to the second direction, or vice versa.

In another embodiment, referring to FIG. 2A, second, third and fourth members M302, M303, and M304, are extended from the third rack, first and second members M301 and M302 can be orientated to be in the same plane in the third direction;

second, third and the fourth members M302, M303, and M304 can be integrated as one part of the intersection; and the first and second member can be an integrated as one part of the intersection of the intersection.

Figure 3E:
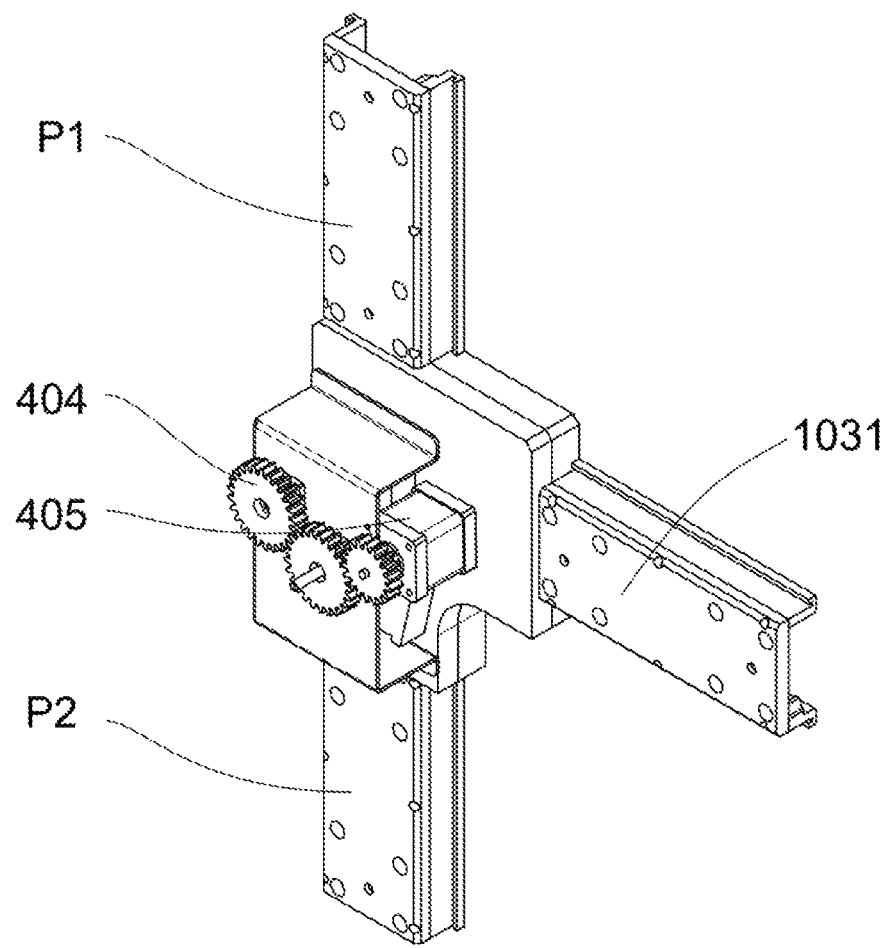

In one embodiment, referring to FIG. 3E, intersection 301 includes a transmission unit 404 and a driving unit 405 to drive slabs 4011 and 402, wherein transmission unit 404 includes some bearings, and driving unit includes at least a motor.

Figure 2D:
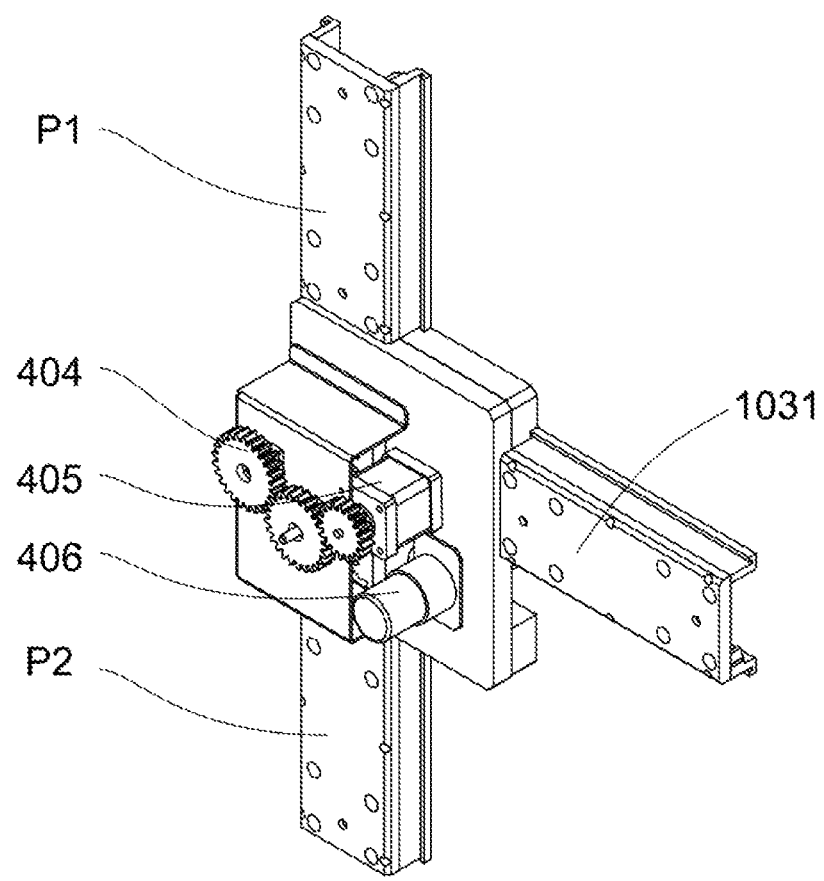

In one embodiment, referring to FIG. 2D, intersection 301 further includes a second driving unit 406 to drive slab 403.

In one embodiment, referring to FIG. 3B and FIG. 3C, slab 4011 includes a rack S4011 and a gear S4012, wherein the meshing line of rack S4011 is tangent to the pitch circle of gear S4012.

Figure 4A:
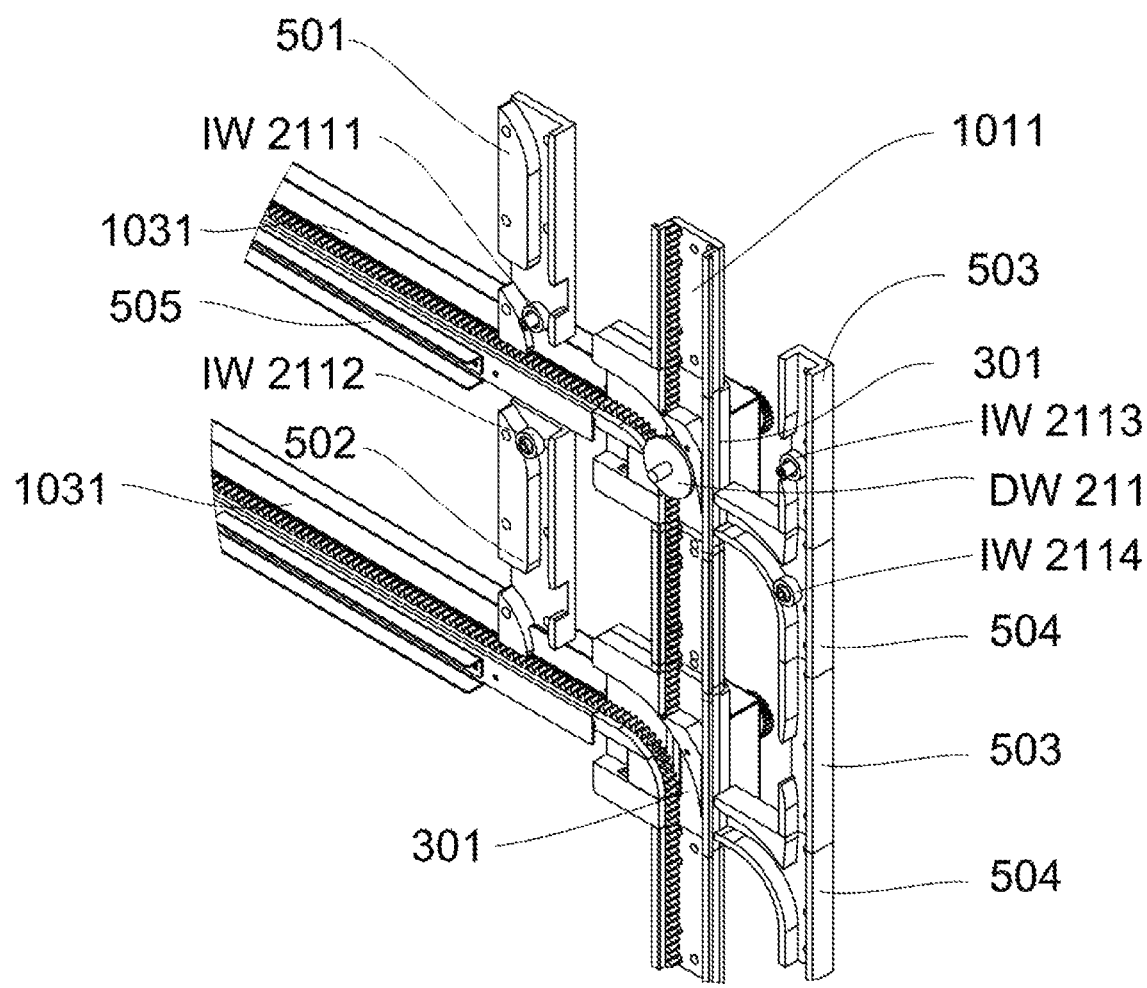
FIG. 4A-FIG. 4B are the schematic diagrams of the members in another embodiment of the disclosure, when the carriage moves from the first direction to the second direction, or vice versa.
Figure 4B:
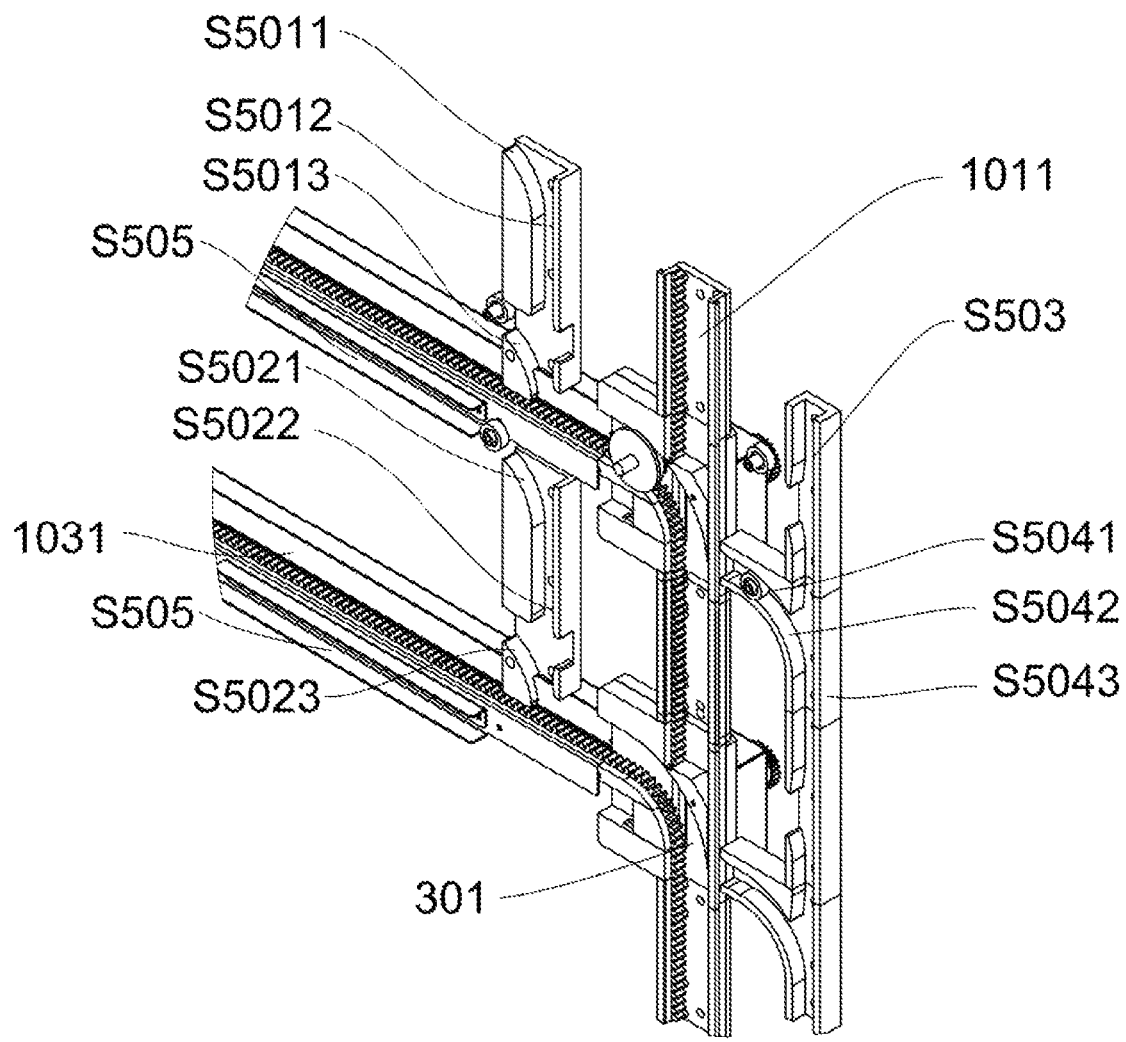
Figure 5A:
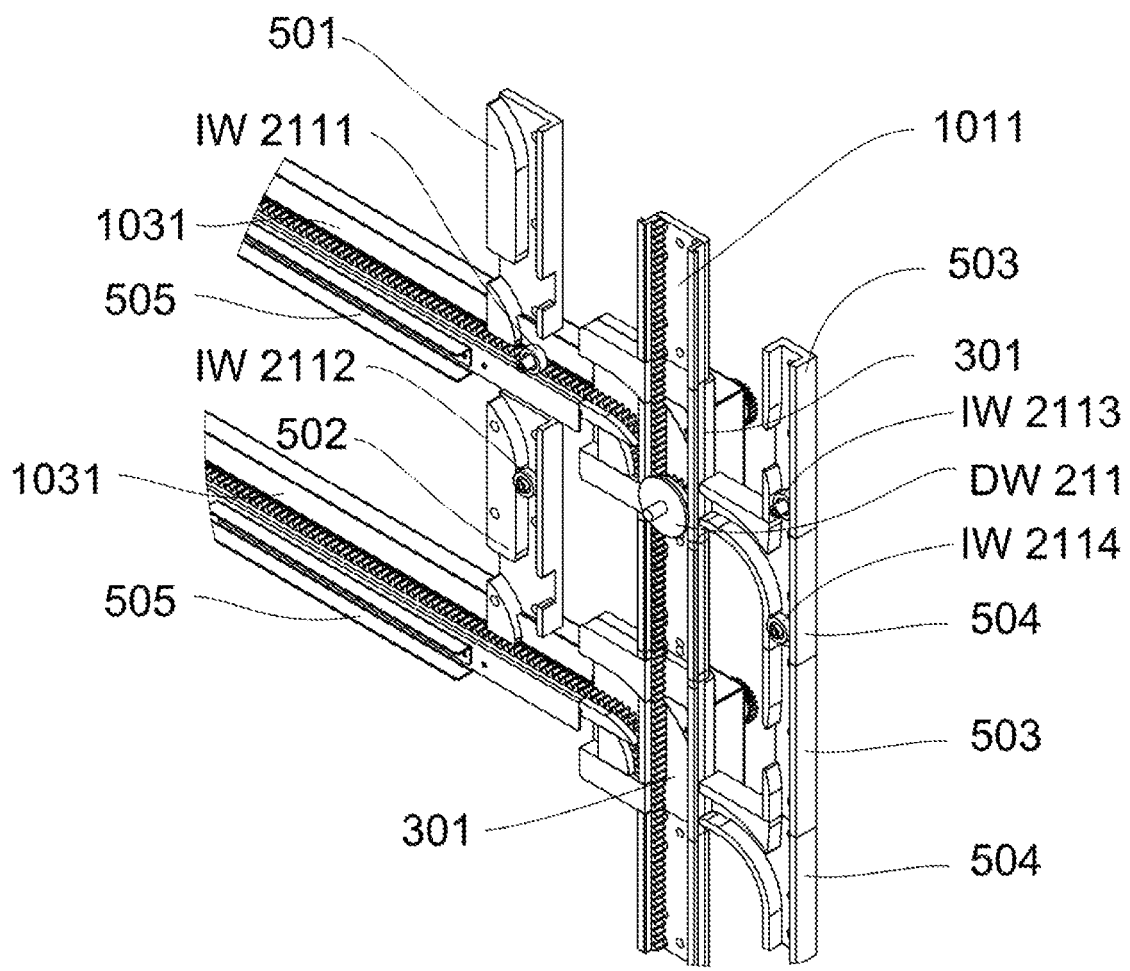
FIG. 5A-FIG. 5B are the schematic diagrams of the members in another embodiment of the disclosure, when the carriage moves from the bottom to the top in the first direction, or vice versa.
Figure 5B:
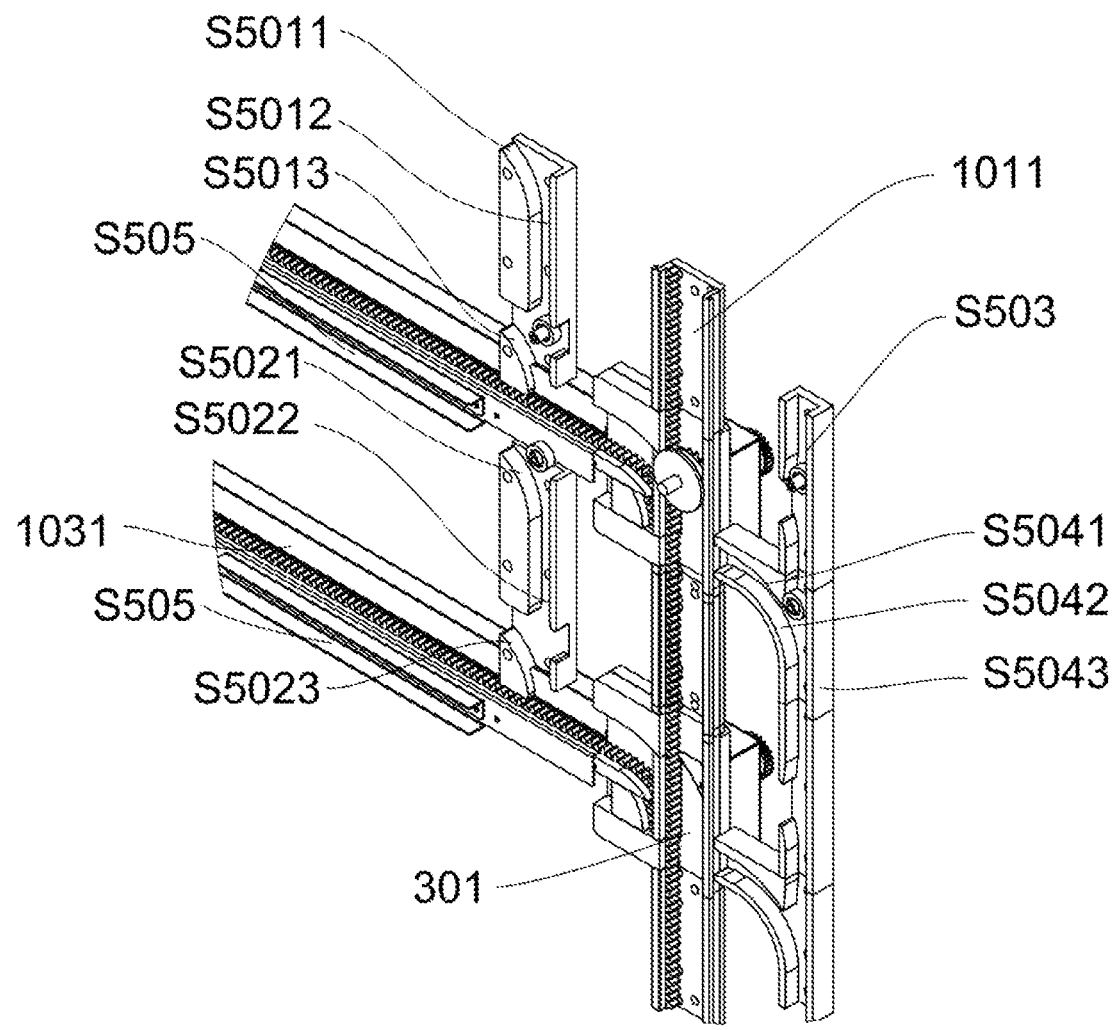

In one embodiment, referring to FIGS. 4A and 4B, an upper leveling rail 503 and a lower leveling rail 504 are on the outside of vertical rail 1011 in the second direction and parallel or substantially parallel to the first rack, for keeping a carriage parallel to the ground.

In another embodiment, referring to FIGS. 4A and 4B, an upper leveling rail 501 and a lower leveling rail 502 are respectively on the upper side and lower side of horizontal rail 1031 in the first direction and parallel or substantially parallel to the first rack, for keeping a carriage level with the ground. And leveling rails 501 and 502 respectively have an upper arc surface and lower arc surface, such as upper arc surfaces 5011 and 5021, and lower arc surfaces 5013 and 5023.

In another embodiment, referring to FIGS. 4A and 4B, lower leveling rails 504 also includes an arc surface S5041.

Arc surfaces S5041 and S5021 are about at a same height. And arc surfaces S5013, S5021 and S5041 are used for guiding some wheels of a carriage to maintain the orientation of the carriage relative to the horizon as the carriage drives along the rack apparatus.

In another embodiment, leveling rail 503 has a gap for a wheel of a carriage to pass through as the carriage drives along the rack apparatus, wherein the gap and arc surface S5013 are about at a same height.

In one embodiment, the leveling rails are discrete segments.

In another embodiment, the leveling rails do not have teeth or notches, and the carriage passes through the leveling rails by the use of idler wheels, such as idler wheels IW2111, IW2112, IW2113, and IW2114 on the right side of carriage 200.

In another embodiment, a horizontal groove 505 is attached to horizontal rail 1031 of the third rack, wherein groove 505 is located on a side of horizontal rail in the third direction and opposed to horizontal rail 1032 of the third rack.

In another embodiment, horizontal groove 505, arc surface S5013, arc surface S5021, and arc surface S5041, are in a same plane in the second direction and perpendicular or substantially perpendicular to the ground.

Because he multiple leveling rail as the auxiliary guiding rails guide a carriage to pass through the intersection and maintain the horizontal orientation of the carriage, the rack apparatus reduces the need for driving wheels, the rotation of driving wheels and the power mechanism thereof.

It is understood that, when the carriage reaches the target position for holding the items, the main body of the carriage is parallel to the ground, and the target position is also generally parallel to the main plane of the carriage.

Figure 6A:
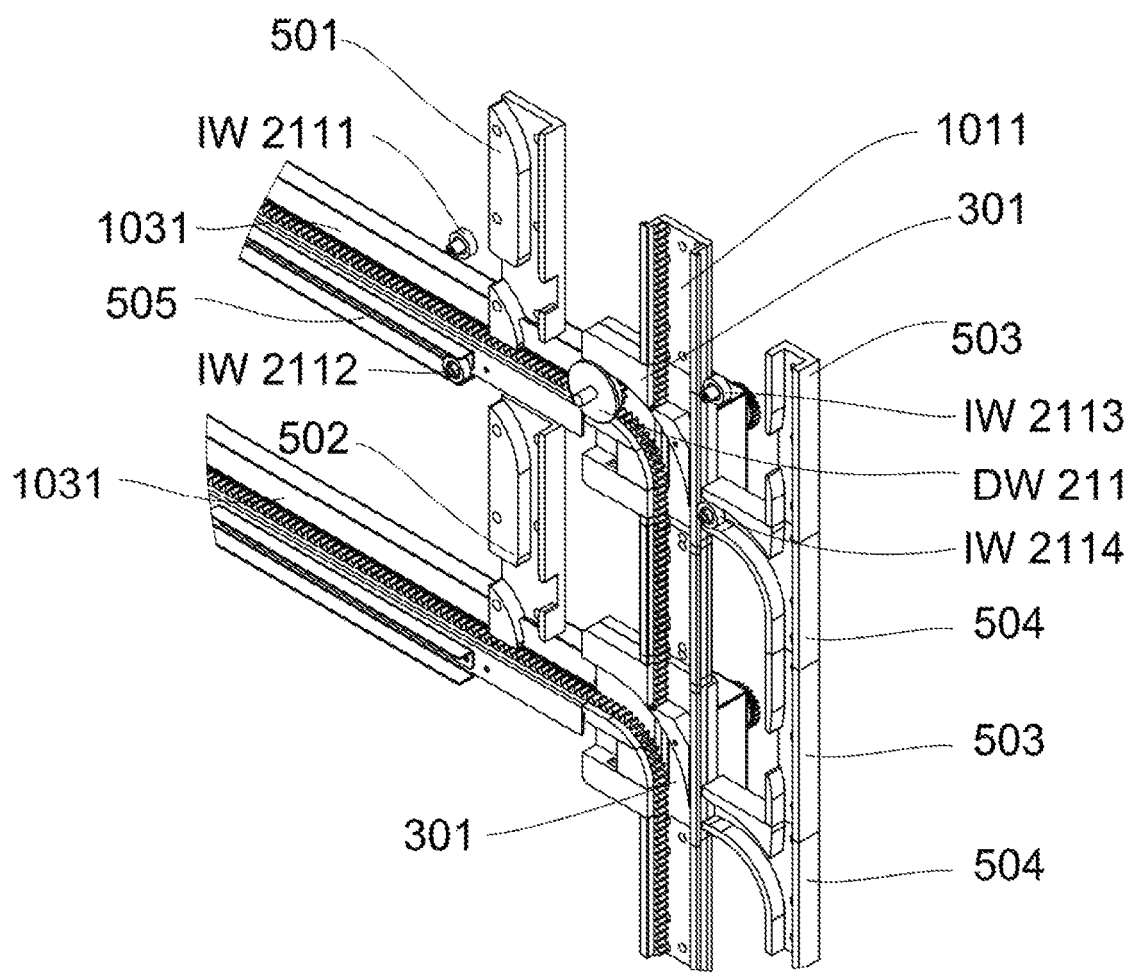
FIG. 6A-FIG. 6C are the schematic diagrams of the members in another embodiment of the disclosure, when the carriage moves from the left to the right in the second direction, or vice versa.
Figure 6B:
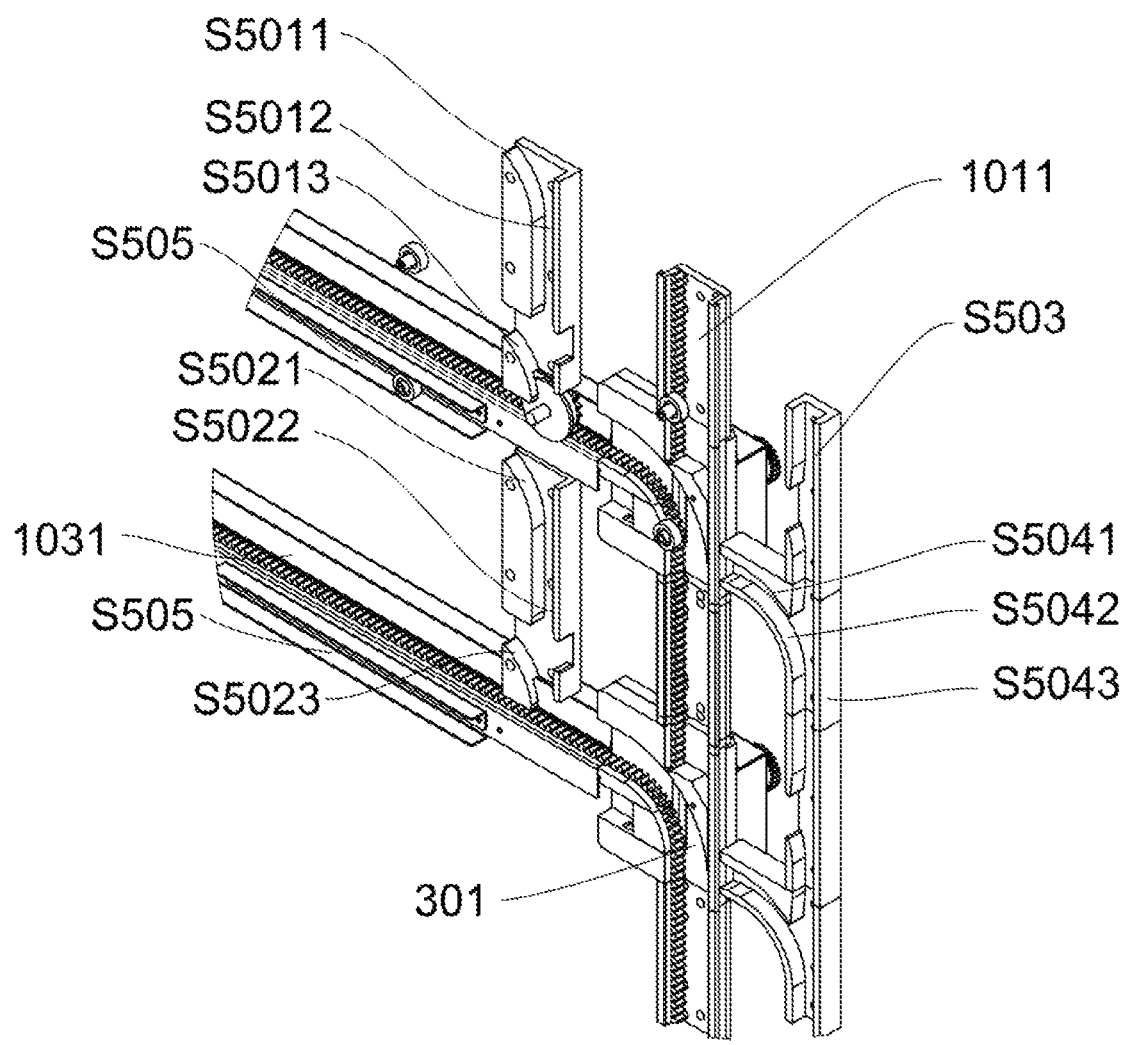
Figure 6C:
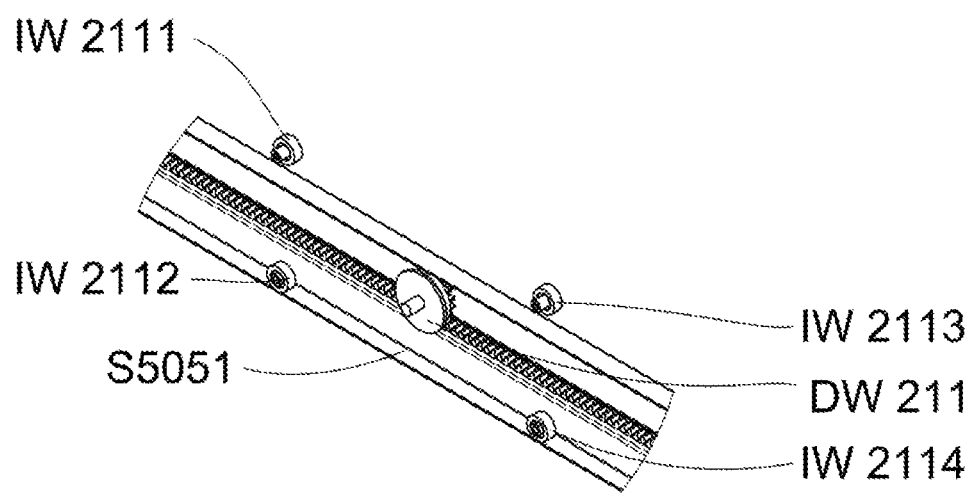
Figure 6D:
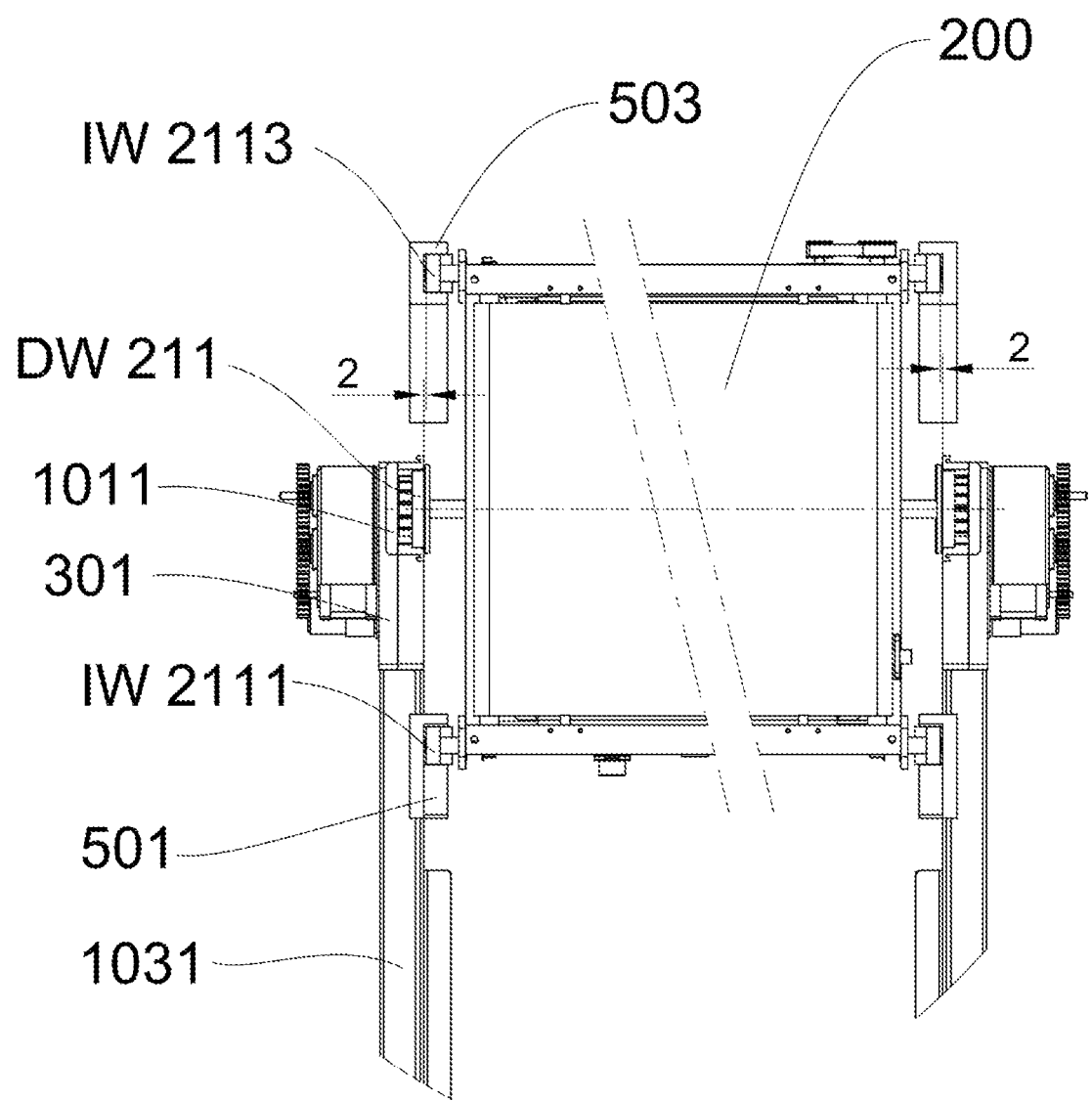
FIG. 6D is the top view in another embodiment of the disclosure, when the carriage moves from the left to the right in the second direction, or vice versa.

Referring to FIG. 6D, a spacing 2 in the third direction exists between idler wheel IW2113 and driving wheel DW211 of the carriage.

In another embodiment, the radian of the arc surface of any leveling rail is roughly consistent with the turning radian at the intersection.

Figure 7A:
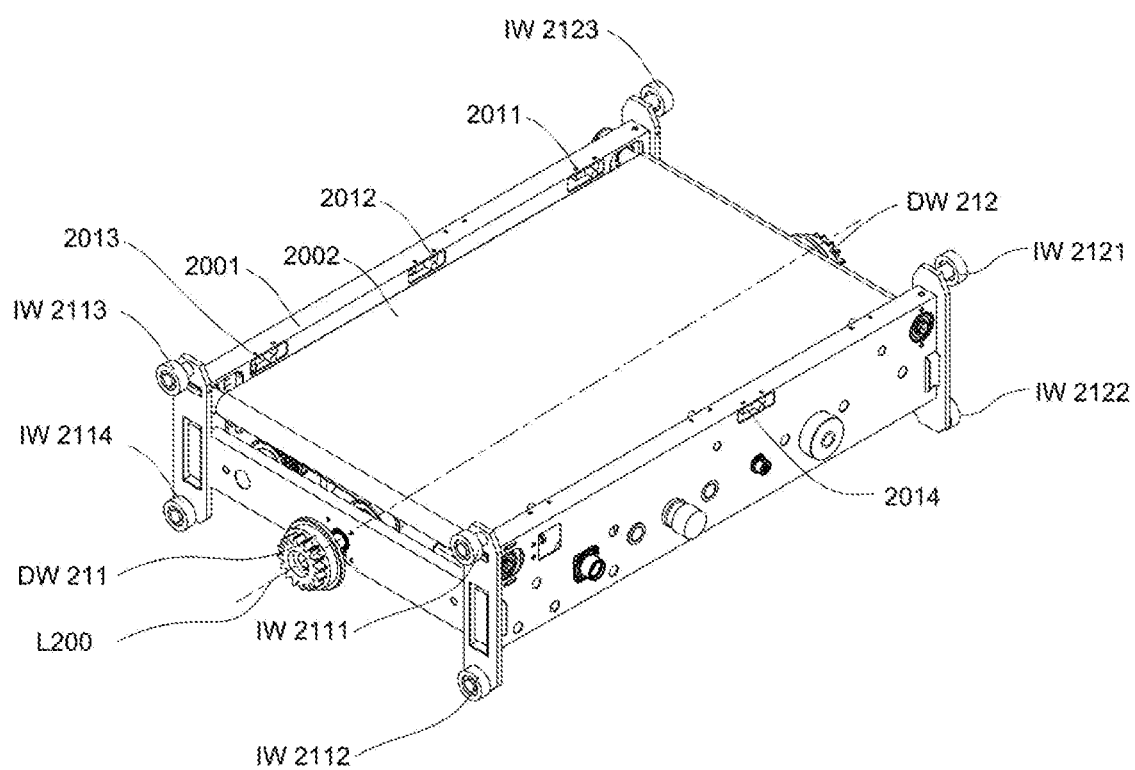
FIG. 7A-FIG. 7B are the schematic diagrams of the carriage of the disclosure.
Figure 7B:
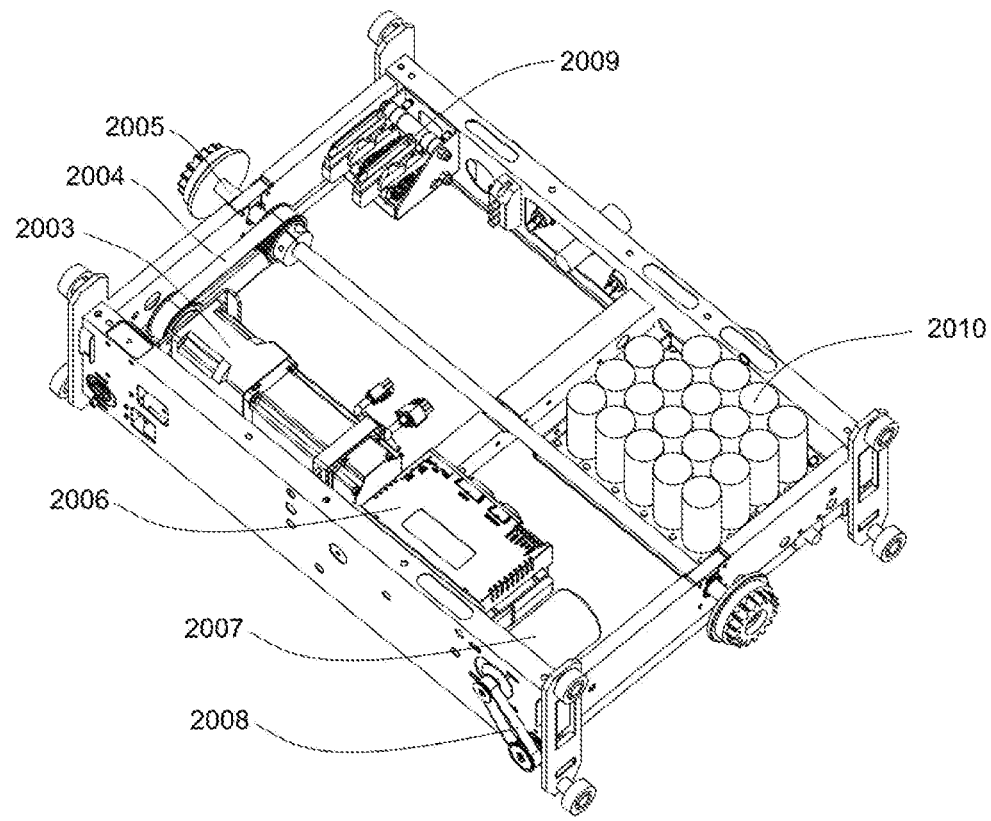

In another embodiment, referring to FIG. 7A, the present disclosure provides a two-wheel drive carriage 200 to move along a rack apparatus, comprising:

a carriage body 2001 having a first end and a second end opposed to the first end;

an item handling mechanism 2002 connected to the carriage body for delivering an article to or from a destination area;

a first driving wheel DW211 approximately located on a first longitudinal central axis of the first end;

a second driving wheel DW212 opposed to the first driving wheel, approximately located on a second longitudinal central axis of the second end;

a first plurality of idler wheels IW2111, IW2112, IW2113, and IW2114 located on both sides of the first end; and a second plurality of idler wheels IW2121, IW2122, IW2123, and IW2124 located on both sides of the second end, wherein the first and second plurality of idler wheels are guided by a plurality of leveling rails of the rack apparatus, thereby being capable of maintaining the orientation of the carriage relative horizontally as the carriage drives along the rack apparatus.

In another embodiment, the carriage is configured with a single axle and it reduces the complexity of the carriage's structure. Further utilizing the idler wheels contact with the leveling rails mentioned above, the carriage can maintain the orientation relative to the horizon when it drives along the rack apparatus.

In one embodiment, the driving wheels DW211 and DW212 are driven by the first motor 2003 via a single driving axle passing through the carriage body. It is understood that, the gear on the driving wheel is matched with the rack apparatus, especially matched with the above-mentioned teeth on the rack apparatus, to drive the carriage along the first direction and/or the second direction. Typically, a chain or synchronous belt can also be set on the rack apparatus in order to cooperate with the driving wheels DW211 and DW212 of the carriage. No matter which specific driving mode is adopted, for example, with teeth or notches engaged with meshing rails like the horizontal rail 1031 and the vertical rail 1011, the corresponding motor can be set in the rail system or the carriage.

In addition, the item handling mechanism 2002 can be equipped with different operation modules to realize different functions such as storage, picking, distribution, etc.

In one embodiment, the item handling mechanism 2002 includes a frame and one or more operation modules connected to the frame, wherein the operation modules include one or more of a transfer mechanism, a clamping and/or telescopic mechanism.

It is understood that, the specific type of mechanism is related to the function of the carriage and the type of materials. For example, the transfer mechanism is used for transferring and sorting materials, wherein, the materials are small and medium-sized items or packages; and the clamping and/or telescopic mechanism is used for moving materials, wherein, the material is the logistics contained in a large and medium-sized turnover container, and the container can be a logistics turnover box, a carton or a pallet.

In one embodiment, the transfer mechanism of the item handling mechanism 506 includes a conveyor belt, and the conveyor belt is driven by a second motor 504 to delivery items.

In one embodiment, the conveyor belt is annular. And the item handling mechanism 2002 supports the annular conveyor belt through two rollers at both ends.

In one embodiment, the clamping and/or telescopic mechanism comprises a telescopic arm, a synchronous belt, a linear module and a plucking rod.

In another embodiment, the carriage includes one or more sensors, such as sensors 2011, 2012, 2013, and 2014, for sensing the state of the carriage and/or the items on the carriage.

Furthermore, the state of the carriage includes the driving state and/or the position of the carriage. As mentioned above, the driving state includes standing by, normal moving, reaching the target position, leaving the target position, being in failure, etc.

In order to sense the driving state and/or the position of the car, one or more proximity sensors and multiple sensing units matched with the one or more proximity sensors can be used. The multiple sensing units are arranged at several different positions of the rack apparatus and the carriage. When the carriage travels along a certain rail and passes through the area acted by the sensing unit, the proximity sensor generates an induction signal. Then, the position of the carriage relative to the rack apparatus is determined by the inductive signal.

In addition, thru-beam sensors can be utilized to sense the position of the items relative to the item handling mechanism.

Typically, the thru-beam sensors are arranged in a matrix. When the item handling mechanism processes the items, the items will trigger zero or one or more of the sensors. And then, the position of the items relative to the item handling mechanism can be determined by the triggering relationship.

In another embodiment, the carriage includes one or more brushes for conducting electric current.

In another embodiment, the item handling mechanism 2002 includes a visual recognition module and at least a machine-hand/manipulator cooperating with the recognition module, for more accurate operation of objects/items, such as a grabbing action. For the visual recognition module, it comprises a camera and a processor.

Figure 8A:
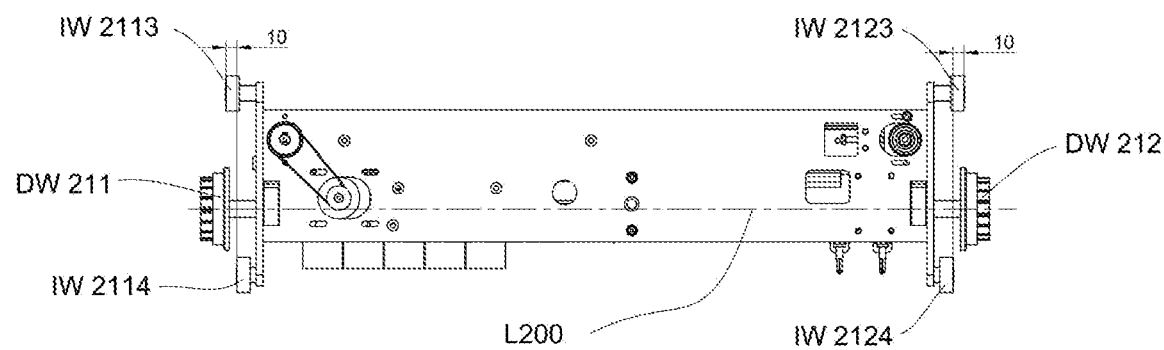
FIG. 8A-FIG. 8D are the schematic diagrams of the upper idler wheel and the lower idler wheel of the carriage in another embodiment of the disclosure.
Figure 8B:
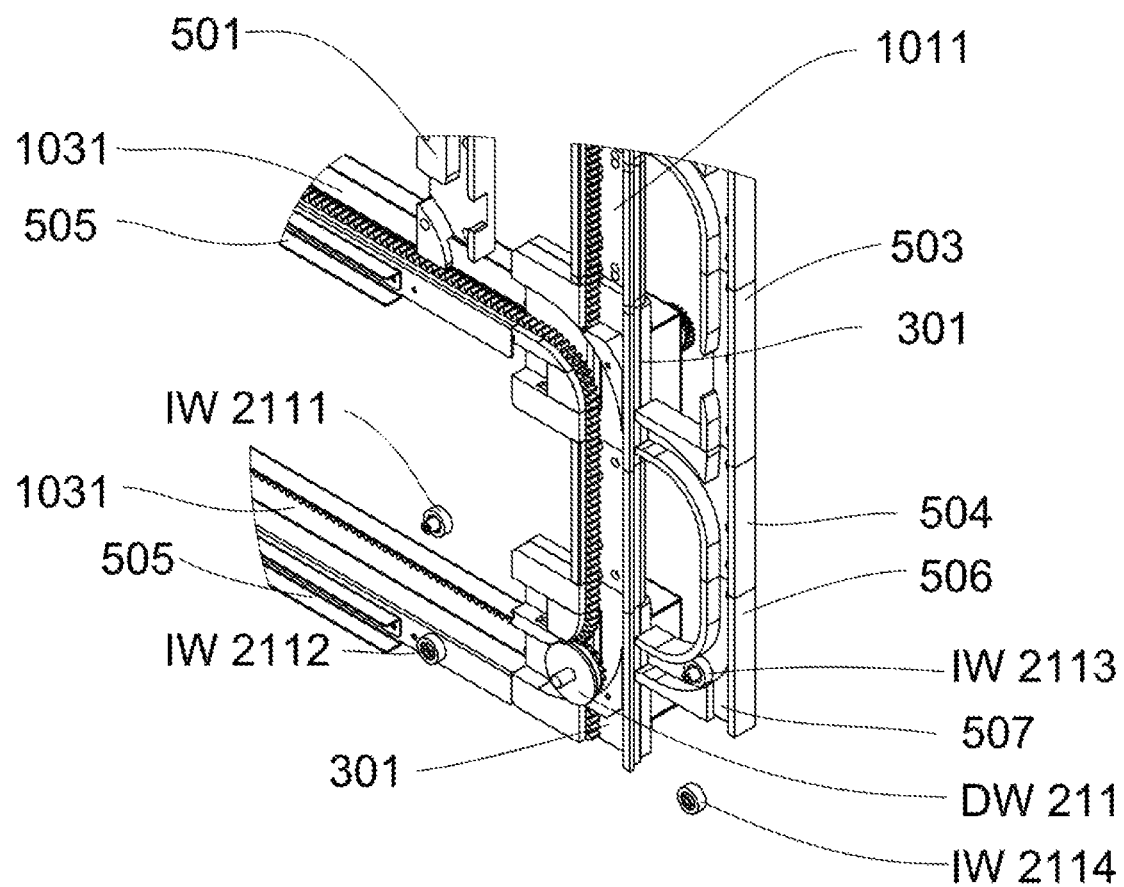
Figure 8C:
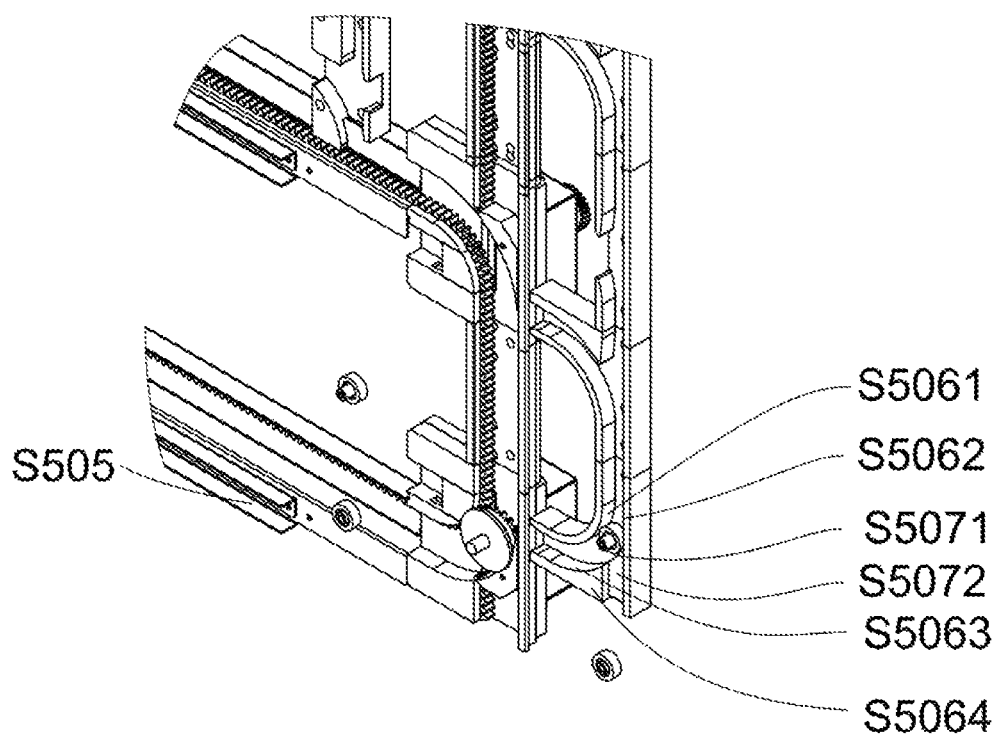
Figure 8D:
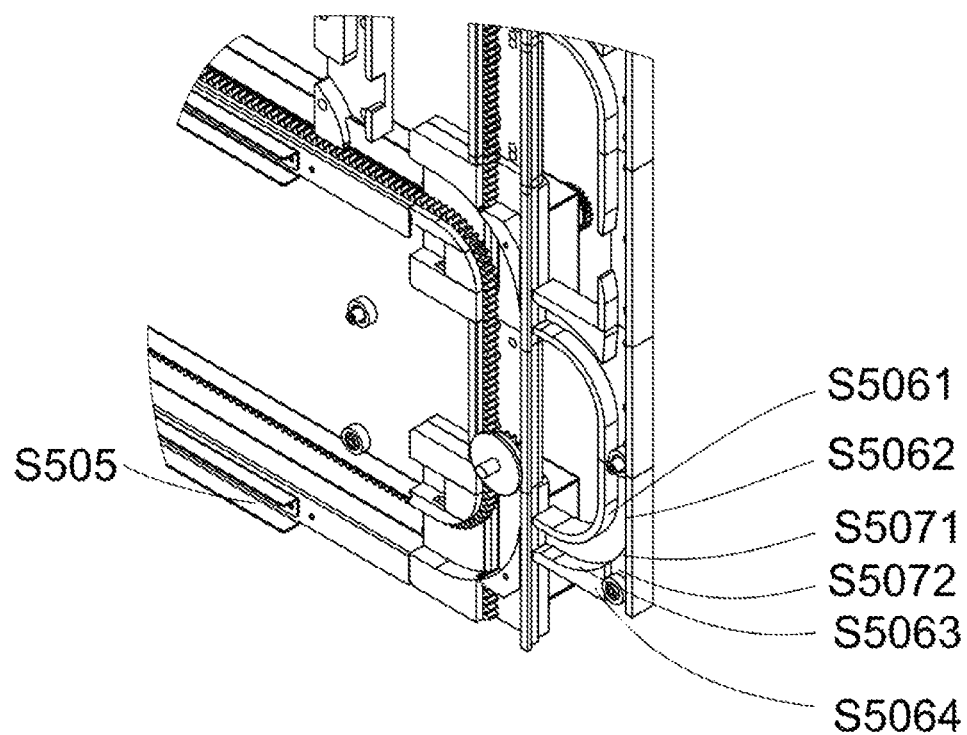

In one embodiment, referring to FIG. 8A and FIG. 7A, the first and second idler wheels IW2111 and IW2113 have a first same plane and the third and fourth idler wheels IW2112 and IW2114 have a second same plane along the first longitudinal central axis L200, and wherein the first same plane and the second same plane has a first distance 10 to be a first predetermined value so that the first and second plurality of idler wheels are guided by the plurality of leveling rails of the rack apparatus.

In another embodiment, the present disclosure provides a delivery carriage driving along a rack apparatus, comprising:

a carriage body;

item handling mechanism carried by the carriage body for delivering one or more items; and a main control module set on the carriage body, wherein the main control module comprises a processing unit and a communication unit;

wherein, the processing unit is used for calculating the own safe travel distance of the carriage based on predetermined traffic rules and executing it on its own, and for determining the real-time location of the carriage, wherein the safe travel distance to prevent the collision between their rights of way of the carriage and the neighboring carriages; and the main control module shares the real-time location of the carriage with its neighboring carriages on the rack apparatus by the use of the communication unit.

As described above, without any independent central traffic controller, one delivery carriage can share its real-time location with its neighboring carriages on the rack apparatus and execute the safe travel distance on its own.

In another embodiment, the present disclosure provides an automated storage and distribution system, comprising: multiple storage and distribution locations on both sides of the rack apparatus for sorting or retrieving multiple items; the rack apparatus as mentioned above; and the carriage as mentioned above.

It is understood that the automated storage and distribution system is significantly improved by the use of the rack apparatus and the carriage.

In another embodiment, the automated storage and distribution system further includes a power supply module, for driving each motor of the rack apparatus described above, each motor of the carriage described above, and supplying power for other modules. It should be noted that, the power supply module can be arranged in the rack apparatus, can also be arranged in the carriage, and can be independent of the rack apparatus and the carriage.

In another embodiment, the power supply module further includes one or more energy storage units.

It is understood that, the energy storage unit can be a super capacitor and/or a battery, especially a rechargeable battery, such as a lithium battery. Typically, the energy storage unit can be arranged in the carriage or the rack apparatus.

In another embodiment, the automated storage and distribution system further includes one or more brushes and sliding contact lines arranged in the carriage and/or the rack apparatus, to provide power for the automated storage and distribution system or charge the energy storage unit.

It is understood that, the sliding contact line can cooperate with the brush for conducting electric current in contact manner.

In another embodiment, the automated storage and distribution system further includes one or more power supply coil and wireless power collectors arranged in the carriage and/or the rack apparatus, to provide power for the automated storage and distribution system or charge the energy storage unit.

It is understood that, the power supply coil can cooperate with the wireless power collector for conducting electric current in non-contact manner. The contact mode is more expensive than the non-contact mode, but there is no wear caused by contact.

In another embodiment, the automated storage and distribution system further includes one or more sensors for sensing the position and driving state of the carriage.

It should be noted that, the sensor can be arranged in the rack apparatus, and can also be arranged in the carriage, and can be independent of the rack apparatus and the carriage.

On the one hand, the movable rails of the intersection can be active and has active power, wherein the active power is provided by an electric motor or pneumatic mechanism; and according to the sensed driving state and position, the movable rails actively moves to provide the first path or the second path for the carriage.

On the other hand, the movable rails of the intersection can also be passive without any active power; and the carriage, on the basis of its own driving state and position, forces the movable rails to move and provide the first path or the second path.

In another embodiment, besides the rack apparatus and the carriage, the automated storage and distribution system further includes an automatic conveying mechanism, wherein the automatic conveying mechanism includes a roller conveying line and a robot for moving materials or turnover containers.

It is understood that, when the carriage reaches the target position, the automatic conveying mechanism is docked with the material handling position at the target position, so as to realize the automatic processing of the turnover container or material between the automatic conveying mechanism and the carriage.

Furthermore, a reminder can be set at the material handling position to prompt the status of the material processing position, wherein, the reminder includes an LED, a digital tube and a buzzer.

In another embodiment, the present disclosure provides a method system for transferring items between delivery carriages and a plurality of destination areas positioned along a plurality of horizontal rails, comprising the following steps:

1) calculating a route for the one of the carriages to travel along the vertical and horizontal rails to one of the destination areas;

2) driving the one carriage along the route to the one destination area, wherein the step of driving the one carriage comprises the following steps:

monitoring the positions of the carriages on the rail;

determining the next safe position for one carriage based on the positions of the carriages on the rail, wherein the safe position is the position that the one carriage can reach along the calculated route without interfering with another carriage on the rail;

communicating the next safe position with the carriage;

advancing the carriage along the route to the next safe position; and as the carriages move along the rail, iteratively performing the steps of determining the next safe position, communicating the next safe position, and advancing the carriage to the next safe position;

transferring an item between the one carriage and the one destination area.

In one embodiment, the one carriage comprises an onboard transfer mechanism and the step of transferring an item comprises using the onboard transfer mechanism.

In one embodiment, the step of communicating the next safe position comprises wirelessly sending a signal to the one carriage.

In one embodiment, the step of monitoring comprises the step of periodically communicating a position signal from the one carriage indicative of the position of the one carriage.

In one embodiment, the method system further comprising the step of manipulating a gate to change the direction of travel of the carriage along the calculated route.

In one embodiment, the step of calculating a safe position is also based on the position of all the carriages on the rail.

The numbered idler wheels can be 6 on one side and 12 on both sides.

The diver wheel has different plane from the idler wheel.

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible considering the teachings or may be acquired from practicing the disclosed embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the said-described embodiments, but instead is defined by the appended claims considering their full scope of equivalents.

What is claimed is:

1. A rack apparatus for guiding a carriage to deliver an article to or from a destination area, comprising:
   a first rack at a first side of the rack apparatus extending in a first direction;
   a second rack opposed to the first rack, disposed at a second side of the rack apparatus and parallel or substantially parallel to the first rack;
   a third rack disposed between the first rack and the second rack, extending in a second direction and perpendicular or substantially perpendicular to the first direction; and
   an intersection between the third rack and each of the first and the second racks,
   wherein each of the first, second and third racks comprises two rails in parallel;
   wherein the intersection comprises a plurality of slabs that are capable of guiding the carriage to move in either the first direction or the second direction;
   wherein the plurality of slabs comprises a first slab and a second slab, wherein each of the first and second slabs are capable of moving in the third direction between a first position and a second position; and
   wherein the plurality of slabs further comprises a third slab; and wherein the third slab can move in the second direction between a third position and a fourth position.

2. The rack apparatus of claim 1, wherein
   when the first and second slabs are in the first position and the third slab is in the third position, the carriage is capable of moving along one of the first and second racks; and
   when the first and second slabs are in the second position, and the third slab is in the fourth position, the carriage is capable of moving along the third rack.

3. The rack apparatus of claim 1, wherein the first slab has a first side wall and the first side wall has a first plurality of gear teeth or notches; and the first plurality of gear teeth or notches can guide the movement of the carriage in the first direction.

4. The rack apparatus of claim 1, wherein the first slab has a first side wall and a second arc-shaped side wall, wherein
the first side wall has a first plurality of gear teeth or notches; and the first plurality of gear teeth or notches can guide the movement of the carriage in the first direction; and
the second arc-shaped side wall has a second plurality of gear teeth or notches, so that the second plurality of gear teeth or notches can guide the carriage to move in the first direction to the second direction, or vice versa.

5. The rack apparatus of claim 1, wherein the second slab has a first arc-shaped side wall so that the carriage can be guided to move in the first direction to in the second direction, or vice versa.

6. The rack apparatus of claim 2, wherein the third slab has a second arc-shaped side wall and the second arc-shaped side wall has a second plurality of gear teeth or notches, so that the second plurality of gear teeth or notches can guide the carriage to move in the first direction to in the second direction, or vice versa.

7. The rack apparatus of claim 1, further comprising:
a fourth rack disposed between the first rack and the second rack, extending in the second direction, parallel or substantially parallel to the third rack, and separated from the third rack in a third direction; and
an intersection between the fourth rack and each of the first and the second racks;
wherein the intersection comprises a plurality of slabs that are capable of guiding the carriage to move in either the first direction or the second direction.

8. The rack apparatus of claim 7, wherein the third rack and the fourth rack form a closed-loop path for the carriage through the intersection.

9. The rack apparatus of claim 1, wherein each of the first and the second racks has a third side wall and the third side wall has a third plurality of gear teeth or notches; and the third plurality of gear teeth or notches can guide the movement of the carriage in the first direction; and
each of the third and fourth racks has a fourth side wall and the fourth side wall has a fourth plurality of gear teeth or notches; and the fourth plurality of gear teeth or notches can guide the movement of the carriage in the second direction.

10. The rack apparatus of claim 1, wherein the intersection further comprises a first member, wherein the first member is disposed between an upper member and a lower member of one of the first and second racks, and the first member can guide the movement of the carriage in the first direction.

11. The rack apparatus of claim 10, wherein the first member has a fifth side wall and the fifth side wall comprises a fifth plurality of gear teeth or notches; and the fifth plurality of gear teeth or notches can guide the movement of the carriage in the first direction.

12. The rack apparatus of claim 10, wherein the intersection further comprises a second member, wherein the second member can guide the movement of the carriage in the second direction.

13. The rack apparatus of claim 12, wherein the intersection further comprises a third member attached to the second member; the third member has a sixth side wall; the sixth side wall comprises a sixth plurality of gear teeth or notches; and the sixth plurality of gear teeth or notches can guide the movement of the carriage in the second direction.

14. The rack apparatus of claim 13, wherein the intersection further comprises a fourth member attached to the second member, and the fourth members has a second arc-shaped side wall so that the carriage can be guided to move in the first direction to the second direction, or vice versa.

15. The rack apparatus of claim 14, wherein the second, third and the fourth members are extended from the third rack, the first and second members can be orientated to be in the same plane in the third direction;
the second, third and the fourth members can be integrated as one part of the intersection; and
the first and second members can be an integrated as one part of the intersection of the intersection.

* * * * *